(12) United States Patent
Koda et al.

(10) Patent No.: US 11,899,989 B2
(45) Date of Patent: Feb. 13, 2024

(54) INFORMATION PROCESSING APPARATUS, IMAGE FORMING SYSTEM, INFORMATION PROCESSING METHOD, AND NON-TRANSITORY RECORDING MEDIUM FOR MONITORING COLOR MATCHING PROCESSING

(71) Applicants: Shunsuke Koda, Kanagawa (JP); Akiko Bamba, Tokyo (JP); Kanako Hirasawa, Kanagawa (JP)

(72) Inventors: Shunsuke Koda, Kanagawa (JP); Akiko Bamba, Tokyo (JP); Kanako Hirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/049,835

(22) Filed: Oct. 26, 2022

(65) Prior Publication Data

US 2023/0141186 A1 May 11, 2023

(30) Foreign Application Priority Data

Nov. 9, 2021 (JP) ................................ 2021-182825

(51) Int. Cl.
*G06F 3/12* (2006.01)
*H04N 1/00* (2006.01)

(52) U.S. Cl.
CPC ............ *G06F 3/1208* (2013.01); *G06F 3/128* (2013.01); *G06F 3/1256* (2013.01); *H04N 1/00045* (2013.01)

(58) Field of Classification Search
None
See application file for complete search history.

(56) References Cited

U.S. PATENT DOCUMENTS

| | | | |
|---|---|---|---|
| 2004/0114165 A1 | 6/2004 | Nakajima | |
| 2012/0250044 A1* | 10/2012 | Teraue | H04N 1/40006 358/1.9 |
| 2014/0253949 A1* | 9/2014 | Tsujimoto | H04N 1/00925 358/1.14 |
| 2016/0301830 A1* | 10/2016 | Shibata | H04N 1/00323 |
| 2017/0054877 A1* | 2/2017 | Shibata | H04N 1/00058 |
| 2019/0095147 A1* | 3/2019 | Yano | H04N 1/6044 |
| 2019/0260911 A1* | 8/2019 | Toriyabe | H04N 1/6008 |

(Continued)

FOREIGN PATENT DOCUMENTS

| | | |
|---|---|---|
| JP | 2004-135312 | 4/2004 |
| JP | 2019-066961 | 4/2019 |

OTHER PUBLICATIONS

Extended European Search Report dated Apr. 6, 2023 issued in corresponding European Appln. No. 22204848.0.

*Primary Examiner* — Henok Shiferaw
(74) *Attorney, Agent, or Firm* — Harness, Dickey & Pierce, P.L.C.

(57) ABSTRACT

An information processing apparatus includes circuitry to cause an image reading device to execute reading processing of a first color chart printed by a particular image forming apparatus of a plurality of image forming apparatuses and display, for each of the plurality of image forming apparatuses, a progress status of each stage of processing from the reading processing of the first color chart to registration processing of a profile generated based on color information data obtained by the reading processing of the first color chart.

15 Claims, 19 Drawing Sheets

(56) References Cited

U.S. PATENT DOCUMENTS

2020/0045185 A1* 2/2020 Kodama ............... H04N 1/1906
2022/0131982 A1* 4/2022 Kihara ............... H04N 1/00029
2022/0141356 A1* 5/2022 Kihara ................ H04N 1/6033
                                                        358/1.9
2022/0174185 A1* 6/2022 Takamizawa ........ H04N 1/6033

* cited by examiner

FIG. 9

| DEVICE NAME | PAPER TYPE | PRELIMINARY DETERMINATION IN-SHEET / INTER-SHEET DEVIATION CMYK | PROFILE GENERATION | PROFILE REGISTRATION |
|---|---|---|---|---|
| A00001 | GLOSS COATED | xxx/xxx C:XX M:XX Y:XX K:XX (10:15) | PROFILE AAAAAAAAAAAAAA (10:18) | |
| B00001 | MATTE | xxx/xxx (2)(3) C:XX M:XX Y:XX K:XX (10:15) | PROFILE AAAAAAAAAAAAAA (10:18) | COMPLETED (10:25) |
| C00001 | GLOSS COATED | ERROR (1) (10:15) | | |
| D00001 | PLAIN | xxx/xxx C:XX M:XX Y:XX K:XX (10:15) | PROFILE AAAAAAAAAAAAAA (10:18) | COMPLETED (10:25) |
| E00001 | GLOSS COATED | xxx/xxx (2)(3) C:XX M:XX Y:XX K:XX (10:15) | PROFILE AAAAAAAAAAAAAA (10:18) | |
| F00001 | MATTE | ERROR (1) (10:15) | | |

COLOR ADJUSTMENT SCREEN

READING PROCESSING IN PROGRESS — SUSPENSION — READ

CHART READING - PROFILE REGISTRATION (1) (2) (3) (4) (5) (6) (7) (8) (9) (10) < >

(1) The in-sheet deviation exceeds the reference value 2. Please follow the instructions below for the printer.
FOR DEVICE TYPE A: ADJUST DENSITY, REPLENISH TONER, ADJUST IMAGE DENSITY DEVIATION (IN DIRECTION PERPENDICULAR)
FOR OTHER DEVICE TYPES: ADJUST IN-SHEET DEVIATION TO REDUCE

POSTERIOR DETERMINATION

| DEVICE NAME | PAPER TYPE | DETERMINATION | DETERMINATION CHART | AVE | MAX |
|---|---|---|---|---|---|
| B00001 | MATTE | OK | JAPAN COLOR | 11.1 | 11.1 |
| C00001 | GLOSS COATED | NG | FOGRA | 22.2 | 11.1 |
| D00001 | PLAIN | OK | G7 | 11.1 | 11.1 |
| F00001 | MATTE | NG | GRACOL | 22.2 | 11.1 |

EXIT

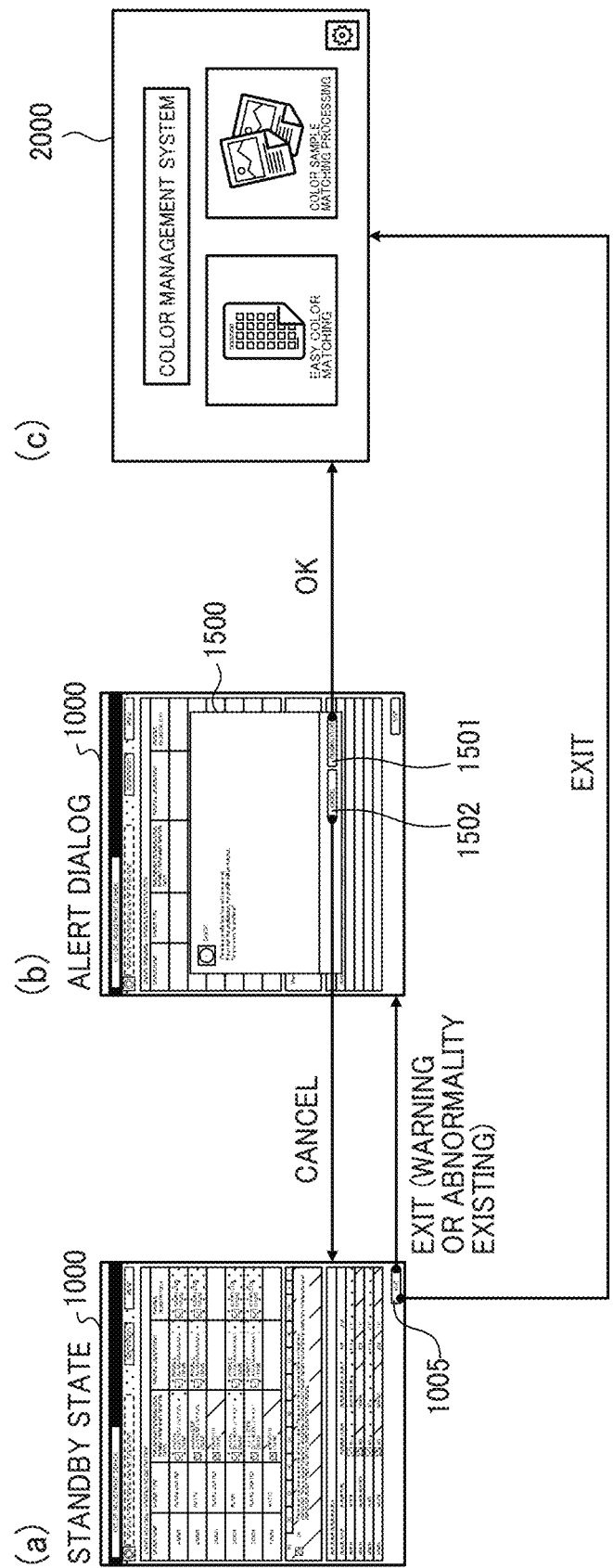

INFORMATION PROCESSING APPARATUS, IMAGE FORMING SYSTEM, INFORMATION PROCESSING METHOD, AND NON-TRANSITORY RECORDING MEDIUM FOR MONITORING COLOR MATCHING PROCESSING

CROSS-REFERENCE TO RELATED APPLICATIONS

This patent application is based on and claims priority pursuant to 35 U.S.C. § 119(a) to Japanese Patent Application No. 2021-182825, filed on Nov. 9, 2021, in the Japan Patent Office, the entire disclosure of which is hereby incorporated by reference herein.

BACKGROUND

Technical Field

The present disclosure relates to an information processing apparatus, an image forming system, an information processing method, and a non-transitory recording medium.

Related Art

Printing companies need to maintain the quality of printed matter. In order to maintain such quality, a predetermined color chart is printed and read with a colorimetric device such as a scanner, to adjust color reproducibility for individual printing machines according to a difference between the color of the printed predetermined color chart and the color of quality target. For this reason, a printing company that has a plurality of printing machines executes color matching processing and generates a printer profile for each of the plurality of printing machines individually using a chart having color patches for color matching.

There is known a technique of adjusting the color reproducibility of a printing machine. An image processing apparatus includes a feature value conversion unit, a past history storage unit, a calculation unit, and a profile update unit. The feature value conversion unit performs color conversion of input data. The past history storage unit stores past history information on measurement of a color chart including values converted from measured values of the color chart. The calculation unit compares the past history information stored in the past history storage unit with information on newly input measurement of the color chart to determine the number of color patches based on a result of the comparison. The profile update unit updates a printer profile based on data in which a determined color chart is loaded and stores the printer profile in the past history storage unit.

However, in a related art, when adjustment of the color reproducibility of the printing machine is performed, various works such as colorimetry (reading) of a color chart printed out by a printing machine, checks of values of the reading result, profile generation and registration, and reprinting of the color chart are performed for each of the plurality of printing machines individually. In this case, there are issues that workability of color matching processing and manageability of data of color matching result are poor.

SUMMARY

In one aspect, an information processing apparatus includes circuitry to cause an image reading device to execute reading processing of a first color chart printed by a particular image forming apparatus of a plurality of image forming apparatuses and display, for each of the plurality of image forming apparatuses, a progress status of each stage of processing from the reading processing of the first color chart to registration processing of a profile generated based on color information data obtained by the reading processing of the first color chart.

In another aspect, an image forming system includes the image reading device, the plurality of image forming apparatuses, and the information processing apparatus described above.

In another aspect, an information processing method includes causing an image reading device to execute reading processing of a first color chart printed by a particular image forming apparatus of a plurality of image forming apparatuses and displaying on a display, for each of the plurality of image forming apparatuses, a progress status of each stage of processing from the reading processing of the first color chart to registration processing of a profile generated based on color information data obtained by the reading processing of the first color chart.

In another aspect, a non-transitory recording medium carrying computer readable codes for controlling a computer system to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a diagram illustrating an example of the color adjustment screen when color matching processing is in progress according to one embodiment of the present disclosure;

FIG. 19 is a diagram illustrating an example of a screen transition when the color matching processing is ended in the information processing apparatus according to one embodiment of the present disclosure.

Figure 1:
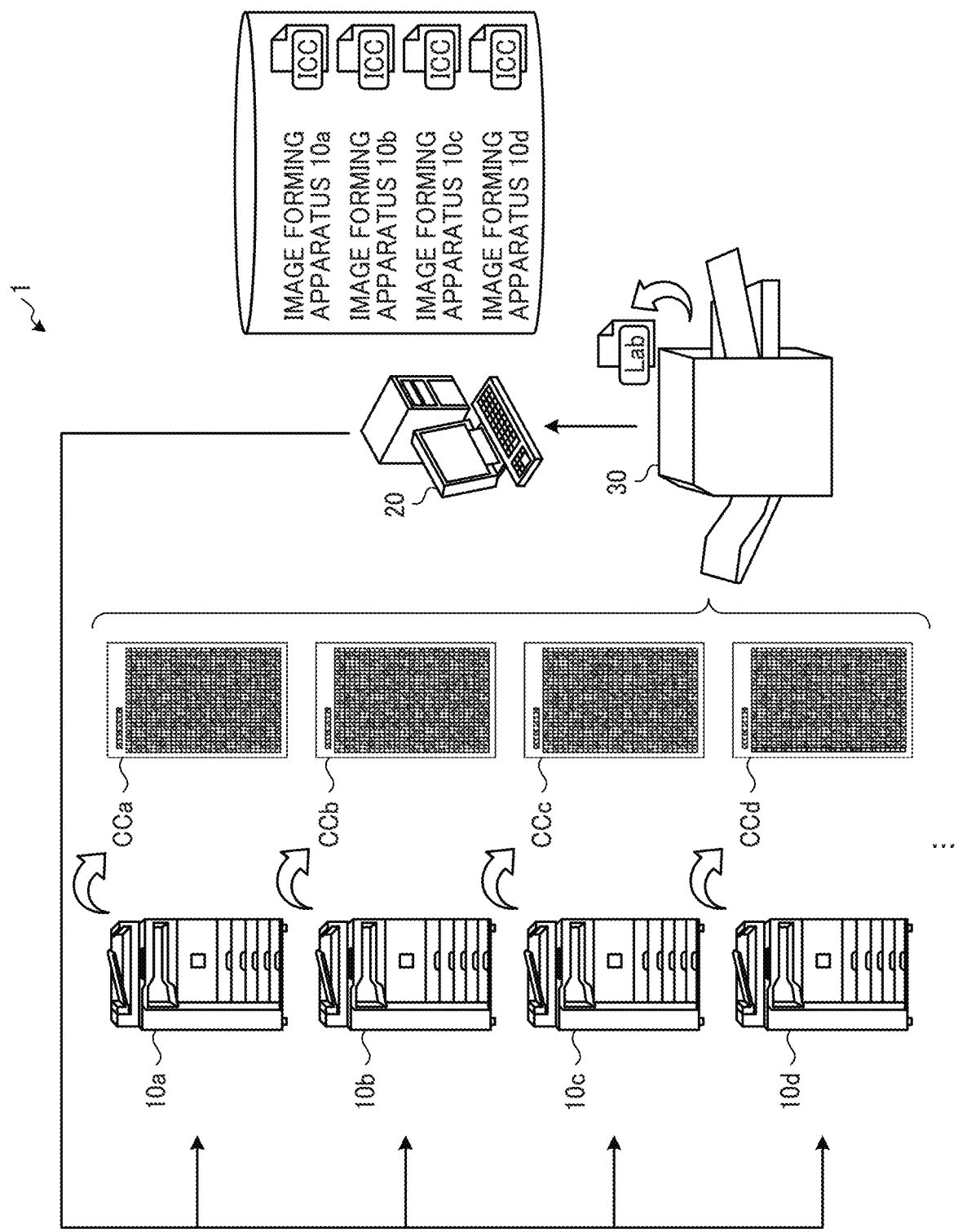
FIG. 1 is a schematic diagram illustrating an example of an overall configuration of an image forming system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given in detail of an information processing apparatus, an image forming system, an information processing method, and a non-transitory recording medium according to one embodiment of the present disclosure with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

Overall Configuration of Image Forming System

FIG. 1 is a schematic diagram illustrating an example of an overall configuration of an image forming system according to the present embodiment. A description is given of the overall configuration of an image forming system 1 according to the present embodiment with reference to FIG. 1.

The image forming system 1 illustrated in FIG. 1 is an information processing system that efficiently enables color matching processing for a plurality of image forming apparatuses by using color charts. As illustrated in FIG. 1, the image forming system 1 includes image forming apparatuses 10a to 10d, an information processing apparatus 20, and an image reading device 30. Each apparatus or device included in the image forming system 1 performs data communication with one another via a network (for example, a network N illustrated in FIG. 4 to be described later).

The image forming apparatuses 10a to 10d are image forming apparatuses such as a multifunction peripheral (MFP) for which color matching processing is executed. Note that the MFP is a multifunction peripheral having at least two of a copying function, a printing function, a scanning function, and a facsimile communication function. As illustrated in FIG. 1, the image forming apparatuses 10a to 10d receive image data of a color chart (hereinafter, sometimes referred to as color chart data) corresponding to each of the image forming apparatuses 10a to 10d held by the information processing apparatus 20, and print out, based on the corresponding color chart data, respective color charts CCa to CCd to be used for color adjustment (adjustment color charts) and color charts to be used for confirmation of processing of posterior determination after the color adjustment (confirmation color charts). A description is given of a specific configuration of the adjustment color charts later with reference to FIGS. 5 and 6.

In the example illustrated in FIG. 1, four image forming apparatuses 10a to 10d are illustrated as the image forming apparatuses, but the number of the image forming apparatuses is not limited in particular, and may be any number not smaller than two. A plurality of image forming apparatuses (in this example, the image forming apparatuses 10a to 10d in FIG. 1) is referred to as image forming apparatuses 10 when the plurality of image forming apparatuses is referred to without distinction or collectively, and one thereof is referred to as an image forming apparatus 10.

Similarly, the adjustment color charts printed out by an individual image forming apparatus 10 (in this example, the adjustment color charts CCa to CCd in FIG. 1) are referred to as color charts CC when the adjustment color charts are referred to without distinction or collectively, and one thereof is referred to as a color chart CC. Note that the individual image forming apparatus 10 is not limited to the MFP, and may be, for example, an ordinary electrophotographic printing apparatus or an inkjet printing apparatus having a printing function as a main function, or a commercial printing apparatus controlled by a digital front end (DFE). In the present embodiment, the image forming apparatus 10 is described as an MFP.

The information processing apparatus 20 is an information processing apparatus such as a personal computer (PC) or a workstation that holds the color chart data to be printed out by the individual image forming apparatus 10. When the color matching processing is executed for the individual image forming apparatus 10, the information processing apparatus 20 transmits the color chart data to the individual image forming apparatus 10. In addition, the information processing apparatus 20 executes the color matching processing for the individual image forming apparatus 10 by using image data obtained by the image reading device 30 executing reading processing of the adjustment color charts CC printed out by the individual image forming apparatus 10, and displays a progress status of the color matching processing for the individual image forming apparatus 10 on a screen. The information processing apparatus 20 generates an international color consortium (ICC) profile by executing the color matching processing for the individual image forming apparatus 10 and transmits the ICC profile to the corresponding image forming apparatus 10. Then, the corresponding image forming apparatus 10 performs print output using the ICC profile (hereinafter, simply referred to as a profile).

A program for controlling display operation of the above-described screen that presents the progress status of the color matching processing for the individual image forming apparatus 10 displayed by the information processing apparatus 20 may be a native application executed on the information processing apparatus 20, or may be a web application whose functionality is provided by a web server or a cloud server.

The image reading device 30 executes the reading processing of the adjustment color chart CC (a first color chart) and the confirmation color chart (a second color chart) printed out by the individual image forming apparatus 10, and generates color information data by converting read values of the adjustment color chart CC and the confirmation color chart into colorimetric values such as L*a*b* values, XYZ values, or RGB values. The image reading device 30 transmits the color information data formed of the converted colorimetric values to the information processing apparatus 20. Examples of the image reading device 30 include, but are not limited to, devices such as an image scanner and a colorimeter, and include any device having a function of acquiring the color information data of the adjustment color chart and the confirmation color chart. In the present embodiment, the colorimetric values converted from the read data obtained by the image reading device 30 executing the reading processing are described as L*a*b* values of the L*a*b* colorimetric system (hereinafter, simply referred to as "Lab values"). The colorimetric values read by the image reading device 30 are not limited to the colorimetric values converted from the read data obtained by the image reading device 30 executing the reading processing. The image reading device 30 may transmit the read data as raw data to the information processing apparatus 20 so that the information processing apparatus 20 converts the raw data into the colorimetric values.

Hardware Configuration of Image Forming Apparatus

Figure 2:
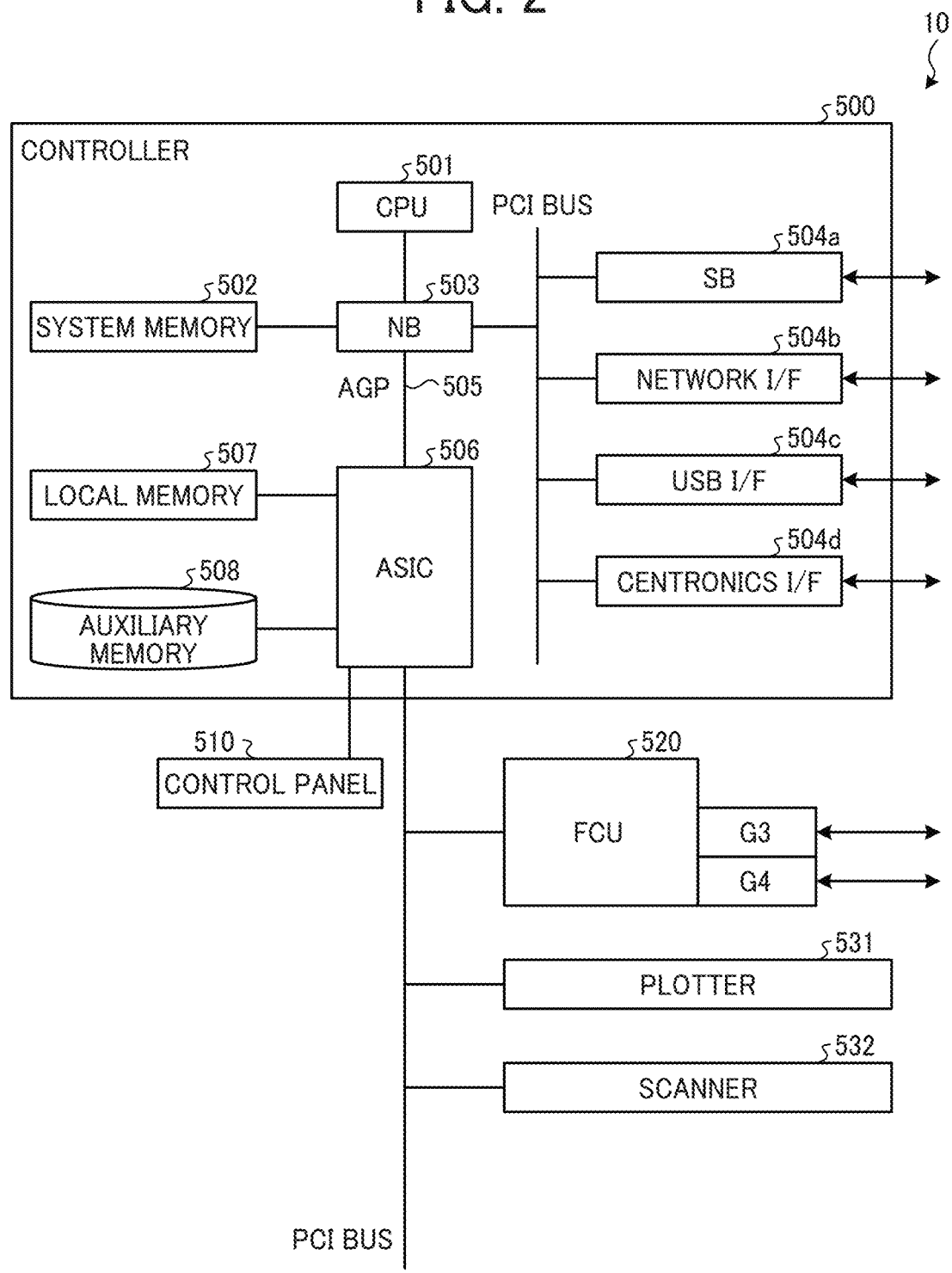
FIG. 2 is a block diagram illustrating an example of a hardware configuration of an image forming apparatus according to one embodiment of the present disclosure.

FIG. 2 is a block diagram illustrating an example of a hardware configuration of an image forming apparatus according to the present embodiment. A description is given of the hardware configuration of the image forming apparatus 10 according to the present embodiment with reference to FIG. 2.

As illustrated in FIG. 2, the image forming apparatus 10 according to the present embodiment includes a controller 500, a control panel 510, a facsimile control unit (FCU) 520, a plotter 531 (printing device), and a scanner 532 that are connected by a peripheral component interconnect (PCI) bus.

The controller 500 is a device that controls entire operation, drawing, and communication performed by the image forming apparatus 10 and controls input from the control panel 510.

The control panel 510 is, for example, a touch panel. The control panel 510 receives an input to the controller 500 (input function) and displays a status of the image forming apparatus 10 (display function), and is directly connected to an application-specific integrated circuit (ASIC) 506 to be described later.

The FCU 520 is a device that provides a facsimile communication function, and is connected to the ASIC 506 via, for example, the PCI bus.

The plotter 531 is a device that provides a printing function, and is connected to the ASIC 506 via, for example, the PCI bus. The scanner 532 is a device that provides a scanning function, and is connected to the ASIC 506 via, for example, the PCI bus.

The controller 500 includes a central processing unit (CPU) 501, a system memory 502, a north bridge (NB) 503, a south bridge (SB) 504a, a network interface (I/F) 504b, a universal serial bus (USB) I/F 504c, a Centronics I/F 504d, the ASIC 506, a local memory 507, and an auxiliary memory 508.

The CPU 501 controls entire operation of the image forming apparatus 10. The CPU 501 is connected to a chipset including the system memory 502, the NB 503, and the SB 504a, and is connected to other devices via the chipset.

The system memory 502 includes a read only memory (ROM) and a random access memory (RAM). The system memory 502 is a memory for storing programs and data, loading programs and data, and loading drawing data. The ROM is a read only memory for storing programs and data. The RAM is a writable and readable memory for loading programs and data, and loading drawing data.

The NB 503 is a bridge for connecting the CPU 501 to the system memory 502, the SB 504a, and an accelerated graphics port (AGP) bus 505. The NB 503 includes a memory controller that controls reading from and writing to the system memory 502, a PCI master, and an AGP target.

The SB 504a connects the NB 503 with PCI devices and peripheral devices. The SB 504a is connected to the NB 503 via the PCI bus, and the network I/F 504b, the USB I/F 504c, and the Centronics I/F 504d are connected to the PCI bus.

The network I/F 504b is an interface for communicating data with an external apparatus such as the information processing apparatus 20 using the network N. The network I/F 504b is, for example, an interface compliant with ETHERNET and can establish communications in compliance with transmission control protocol (TCP)/internet protocol (IP).

The USB I/F 504c is an interface that can communicate with devices compliant with a USB standard.

The Centronics I/F 504d is an interface having a specification of a parallel port that can transmit a plurality of bits.

The AGP bus 505 is a bus interface for graphics accelerator cards to accelerate graphics processing. The AGP bus 505 can speed up the graphics accelerator card by directly accessing the system memory 502 with high throughput.

The ASIC 506 is an integrated circuit (IC) for image processing applications including hardware elements for image processing and has a role of a bridge connecting the AGP bus 505, the PCI bus, the auxiliary memory 508, and the local memory 507 one another. The ASIC 506 includes a PCI target, an AGP master, an arbiter (ARB) as a central processing unit of the ASIC 506, a memory controller for controlling the local memory 507, a plurality of direct memory access controllers (DMACs) capable of rotating image data with a hardware logic, and a PCI unit that transfers data between the plotter 531 and the scanner 532 via the PCI bus. For example, the FCU 520, the plotter 531, and the scanner 532 are connected to the ASIC 506 via the PCI bus. The ASIC 506 is also connected to a host PC and a network.

The local memory 507 is a memory used as a copy image buffer and a code buffer.

The auxiliary memory 508 is a storage area such as a hard disk drive (HDD), a solid state drive (SSD), a secure digital (SD) card, or a flash memory, and stores image data, programs, font data, and forms.

The programs designed for the image forming apparatus 10 may be recorded on a computer-readable recording medium, such as the auxiliary memory 508, for distribution in an installable or an executable file format.

The hardware configuration of the image forming apparatus 10 illustrated in FIG. 2 is an example. The image forming apparatus 10 does not necessarily include all the components illustrated in FIG. 2, or may include some other components.

Figure 3:
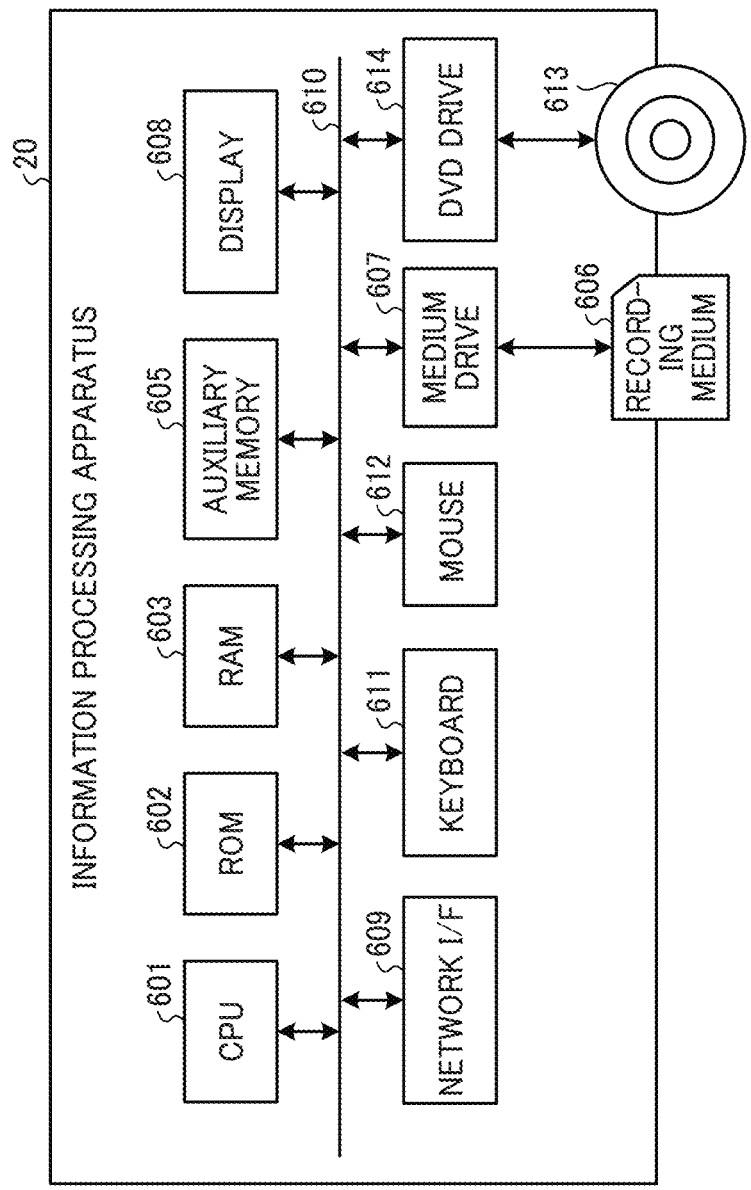
FIG. 3 is a block diagram illustrating an example of a hardware configuration of an information processing apparatus according to one embodiment of the present disclosure.

Hardware Configuration of Information Processing Apparatus FIG. 3 is a block diagram illustrating an example of a hardware configuration of an information processing apparatus according to the present embodiment. A description is given of the hardware configuration of the information processing apparatus 20 according to the present embodiment with reference to FIG. 3.

As illustrated in FIG. 3, the information processing apparatus 20 includes a CPU 601, a ROM 602, a RAM 603, an auxiliary memory 605, a medium drive 607, a display 608, a network I/F 609, a keyboard 611, a mouse 612, and a digital versatile disc (DVD) drive 614.

The CPU 601 is a processor that controls entire operation of the information processing apparatus 20. The ROM 602 is a nonvolatile storage device that stores programs for the information processing apparatus 20. The RAM 603 is a volatile storage device used as a work area for the CPU 601.

The auxiliary memory 605 is a storage device such as an HDD or an SSD that stores various data and programs. The medium drive 607 is a device that controls reading and writing of data to and from a recording medium 606 such as a flash memory under control of the CPU 601.

The display 608 is a display device including a liquid crystal or an organic electro-luminescence (EL) that displays various information such as a cursor, a menu, a window, characters, or an image.

The network I/F 609 is an interface for communicating data with an external apparatus such as the image forming apparatus 10 and the image reading device 30 using the network N. The network I/F 609 is, for example, a network interface card (NIC) compliant with ETHERNET and can establish communications in compliance with TCP/IP.

The keyboard 611 is an input device for selecting characters, numbers, or various instructions, and for moving a cursor, for example. The mouse 612 is an input device for selecting and executing various instructions, selecting a processing object, and moving a cursor, for example.

The DVD drive 614 is a device that controls reading and writing of various data from and to a DVD 613 that is an example of a removable storage medium such as a digital versatile disc read only memory (DVD-ROM) or a digital versatile disc recordable (DVD-R).

The CPU 601, the ROM 602, the RAM 603, the auxiliary memory 605, the medium drive 607, the display 608, the network I/F 609, the keyboard 611, the mouse 612, and the DVD drive 614 are communicably connected to one another via a bus line 610 such as an address bus or a data bus.

Note that the configuration of the information processing apparatus 20 illustrated in FIG. 3 is an example. The information processing apparatus 20 does not necessarily include all the components illustrated in FIG. 3, or may include some other components.

Functional Configuration and Operation of Image Forming System

Figure 4:
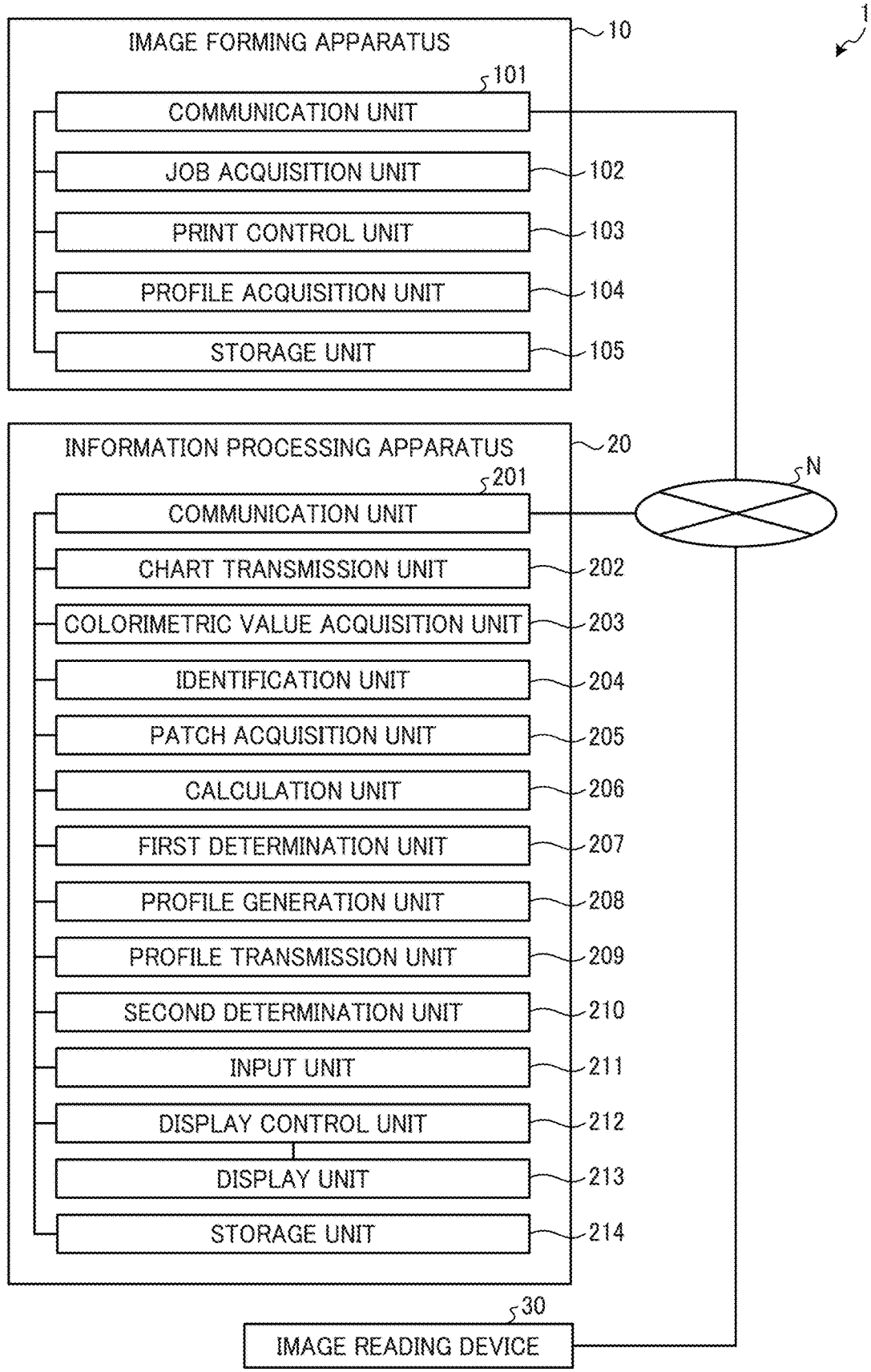
FIG. 4 is a block diagram illustrating an example of a functional configuration of the image forming system according to one embodiment of the present disclosure.
Figure 5:
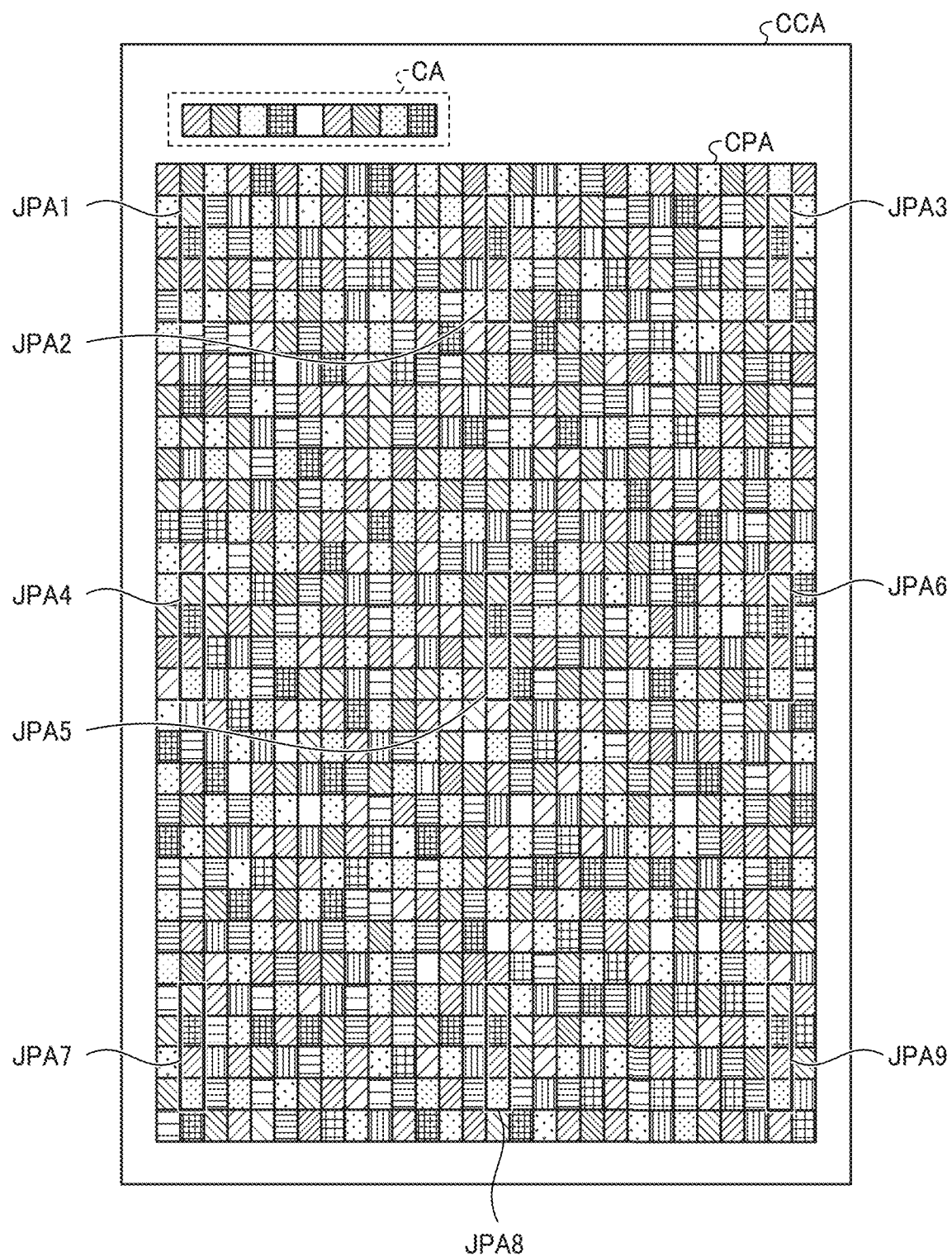
FIG. 5 is a diagram illustrating an example of a first color chart according to one embodiment of the present disclosure.
Figure 6:
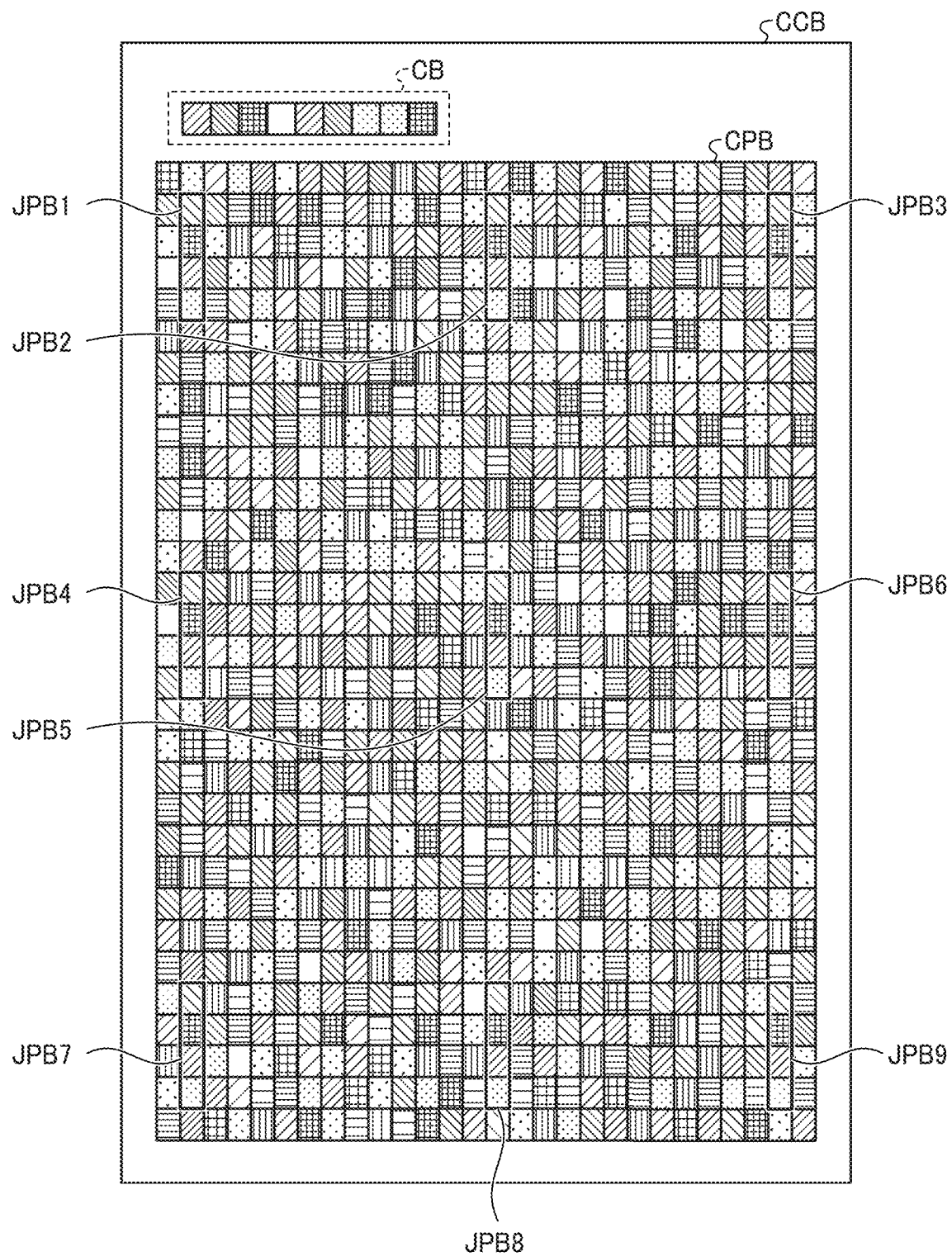
FIG. 6 is a diagram illustrating an example of a second color chart according to one embodiment of the present disclosure.
Figure 7:
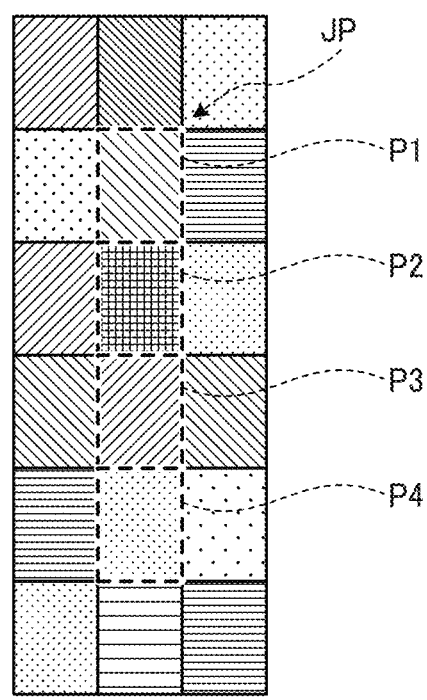
FIG. 7 is an enlarged view of determination patches according to one embodiment of the present disclosure.

FIG. 4 is a block diagram illustrating an example of a functional configuration of the image forming system according to the present embodiment. FIG. 5 is a diagram illustrating an example of a first color chart according to the present embodiment. FIG. 6 is a diagram illustrating an example of a second color chart according to the present embodiment. FIG. 7 is an enlarged view of determination patches according to the present embodiment. A description is given of the functional configuration and operation of the image forming system 1 according to the present embodiment with reference to FIGS. 4 to 7.

As illustrated in FIG. 4, the image forming apparatus 10 includes a communication unit 101, a job acquisition unit 102, a print control unit 103, a profile acquisition unit 104, and a storage unit 105.

The communication unit 101 is a functional unit that performs data communication with the information processing apparatus 20 via the network N. The communication unit 101 is implemented by the network I/F 504b and the CPU 501 illustrated in FIG. 2 executing a program.

The job acquisition unit 102 is a functional unit that acquires a print job of the color chart data from the information processing apparatus 20. In addition, the job acquisition unit 102 acquires normal print jobs (print jobs other than the print job of the color chart data) from external devices via the network N. The job acquisition unit 102 is implemented by, for example, the CPU 501 illustrated in FIG. 2 executing a program.

The print control unit 103 is a functional unit that causes the plotter 531 to print out a color chart (the adjustment color chart CC, the confirmation color chart) based on the print job of the color chart data acquired by the job acquisition unit 102. Note that the confirmation color chart is printed out with a profile acquired by the profile acquisition unit 104 being applied. Further, the print control unit 103 causes the plotter 531 to print out the normal print jobs acquired by the job acquisition unit 102 by applying a profile acquired by the profile acquisition unit 104. When the print control unit 103 causes the plotter 531 to print out the color chart (the adjustment color chart CC, the confirmation color chart), the print control unit 103 also causes the plotter 531 to print, on the color chart, identification information (first identification information) for identifying the image forming apparatus 10 that has printed out the color chart, identification information (second identification information) for identifying a sheet type (i.e., the sheet type of the color chart in this example), page information indicating a sheet number of the color chart, a date and time of the print output, and a color code including identification information indicating a patch array of the color chart. Since the identification information indicating the patch array of the color chart serves as identification information for distinguishing the color chart from other color charts, the identification information indicating the patch array of the color chart can also be regarded as the page information indicating the sheet number of the color chart. Accordingly, the identification information indicating the patch array of the color chart enables determination of whether the color chart is the adjustment color chart CC or the confirmation color chart. In the present embodiment, it is assumed that the adjustment color chart CC is formed of two sheets and the confirmation color chart is formed of one sheet. However, the numbers of the sheets forming the adjustment color chart and the confirmation color chart are not limited thereto. The color chart CC may be formed of one sheet or three or more sheets, and the confirmation color chart may be formed of a plurality of sheets. In a case where the adjustment color chart CC is formed of one sheet, a deviation between sheets is not necessarily calculated. The print control unit 103 is implemented by, for example, the CPU 501 illustrated in FIG. 2 executing a program.

An adjustment color chart CCA illustrated in FIG. 5 and an adjustment color chart CCB illustrated in FIG. 6 are examples of the two sheets of the adjustment color chart printed out under the control of the print control unit 103. As illustrated in FIG. 5, the adjustment color chart CCA is an example of a first sheet of the adjustment color chart CC, and includes a color code CA and a color adjustment patch group CPA. As illustrated in FIG. 6, the adjustment color chart CCB is an example of a second sheet of the adjustment color chart CC, and includes a color code CB and a color adjustment patch group CPB.

As described above, each of the color codes CA and CB is a group of color patches in which the identification information for identifying the image forming apparatus 10 that has printed out each of the adjustment color charts CCA and CCB, the identification information for identifying the sheet type of a sheet on which each of the adjustment color charts CCA and CCB is printed out, the page information indicating the sheet number of each of the adjustment color charts CCA and CCB, the date and time of the print output of each of the adjustment color charts CCA and CCB, and the identification information indicating the patch array of each of the color adjustment patch groups CPA and CPB are encoded. The color codes CA and CB are referred to as color condes C when the color codes CA and CB are referred to without distinction or collectively, and one thereof is referred to as a color code C. Also, the color adjustment patch groups CPA and CPB are referred to as color adjustment patch groups CP when the color adjustment patch groups CPA and CPB are referred to without distinction or collectively, and one thereof is referred to as a color adjustment patch group CP. The color code C is formed of, for example, five color patches of cyan (C), magenta (M), yellow (Y), black (K), and white (W). At both ends of each of the color codes C, color patches indicating the ends of the color code C and specifying a direction of the color code C are arranged. Specifically, as illustrated in FIGS. 5 and 6, the color of two color patches at the left end of the color code C are cyan (C) and magenta (M) from the left in order, and the color of two color patches at the right end of the color code C are yellow (Y) and black (K) from the left in order. Since the colors of these four color patches are fixed and the patch arrays of these four color patches are also fixed, the direction of the color code C can be specified by identifying the patch arrays of these four color patches. The color code C may include color patches of mixed colors of C, M, Y, K, and W in addition to the single colors of these five colors.

Further, color patches arranged between each two color patches at both ends of the color code C indicate encoded information (hereinafter, sometimes referred to as color code information). Each color patch forming the color code C is arranged such that the color patches adjacent to each other do not have the same color. In addition, an integer of numerical values from 0 to 3 is assigned to each color patch indicating the color code information depending on the color of each color patch, for example. Further, the number of digits of a numerical value is determined by the number of color patches indicating the color code information, and the encoded color code information can be digitized (decoded). The numerical value decoded from the color code information includes two numerical value parts: One is associated with setting information and the other indicates the date and time. By referring to the setting information corresponding to the part of the numerical value associated with the setting information, the image forming apparatus 10 (a device name, a device type, an IP address, etc.), the sheet type, the page information indicating the sheet number of the color chart, and the patch array of the adjustment color chart CC (the patch array of the color adjustment patch group CP) defined in the setting information are identified. In addition, the date and time when the adjustment color chart CC is printed out is directly identified with the part of the numerical value indicating the date and time. Thus, the individual image forming apparatus 10 and the sheet type for which the information processing apparatus 20 executes the color matching processing are automatically identified.

Although the identification information for identifying the image forming apparatus 10 that has printed out each of the adjustment color charts CCA and CCB, the identification information for identifying the sheet type of the sheet on which each of the adjustment color charts CCA and CCB is printed out, the page information indicating the sheet number of each of the adjustment color charts CCA and CCB, the date and time of the print output of each of the adjustment color charts CCA and CCB, and the identification information indicating the patch array of each of the color adjustment patch groups CPA and CPB are encoded in each of the color codes CA and CB, the encoded information is not limited thereto. For example, the color codes CA and CB may also include identification information indicating print settings (image density, etc.). In this case, specifically, the identification information indicating print settings may not be directly included in the color code information. The contents of the print settings may be included in the setting information corresponding to the part of the numerical value associated with the setting information. In a case where the date and time when the color codes CA and CB are printed is not necessarily managed, the content indicating the date and time may not be included in the color code information.

Each of the color adjustment patch groups CPA and CPB is a group of color patches used by the information processing apparatus 20 for executing the color matching processing for the image forming apparatus 10 identified with each of the color codes CA and CB. Each of the color adjustment patch groups CPA and CPB is affected by a printing state of each of the adjustment color charts CCA and CCB on a sheet according to a printing operation state of the image forming apparatus 10, and unevenness may occur in one sheet (or one page). When the above-described unevenness in one sheet occurs in the color adjustment patch groups CPA and CPB, the color matching processing for the image forming apparatus 10 cannot be properly executed. For this reason, determination patches JPA1 to JPA9 are embedded at nine positions in the color adjustment patch group CPA of the adjustment color chart CCA according to the present embodiment as illustrated in FIG. 5. The determination patches JPA1 to JPA9 serve as determination patches for evaluating unevenness in one sheet on which the adjustment color chart CCA is printed. Similarly, determination patches JPB1 to JPB9 are embedded at nine positions in the color adjustment patch group CPB of the adjustment color chart CCB according to the present embodiment as illustrated in FIG. 6. The determination patches JPB1 to JPB9 serve as determination patches for evaluating unevenness in one sheet on which the adjustment color chart CCB is printed. In addition, the determination patches JPA1 to JPA9 are arranged at positions independent of each color patch forming the color adjustment patch group CPA as illustrated in FIG. 5. Similarly, the determination patches JPB1 to JPB9 are arranged at positions independent of each color patch forming the color adjustment patch group CPB as illustrated in FIG. 6. Further, the determination patches JPA1 to JPA9 are arranged over a wide area in the color adjustment patch group CPA as illustrated in FIG. 5. Similarly, the determination patches JPB1 to JPB9 are arranged over a wide area in the color adjustment patch group CPB as illustrated in FIG. 6.

Each of the determination patches JPA1 to JPA9 and JPB1 to JPB9 is a group of color patches having the same number of color patches, the same color in respective color patches, and the same array of the color patches. In other words, each of the determination patches JPA1 to JPA9 and JPB1 to JPB9 is formed of a plurality of color patches arranged in a configuration of the same array as illustrated in FIGS. 5 and 6. Note that the determination patches JPA1 to JPA9 and JPB1 to JPB9 are referred to as determination patches JP when the determination patches JPA1 to JPA9 and JPB1 to JPB9 are referred to without distinction or collectively, and one thereof is referred to as a determination patch JP. FIG. 7 is an enlarged view of an example of the determination patch JP according to the present embodiment. As illustrated in FIG. 7, the determination patch JP is formed of four kinds of color patches (gray patches) P1 to P4 in total to facilitate a detection of unevenness in one sheet with high sensitivity. For example, the color patch P1 is a halftone gray patch formed of black (K) single color and the color patches P2 to P4 are halftone gray patches each of which has different halftone gray formed of a composite color (mixed colors) obtained by adding cyan (C), magenta (M), and yellow (Y) in three different densities to black. As illustrated in FIGS. 5 and 6, the above-described determination patch JP is arranged at the nine positions in each of the color adjustment patch groups CPA and CPB as determination patches JPA1 to JPA9 and JPB1 to JPB9. Note that the number of color patches, color in each of the color patches, and an array of the color patches in the determination patch JP are not limited thereto, and the number of color patches in the determination patch JP may not be four, for example. In addition, the number of positions in which the determination patch JP is arranged is not limited to nine, and may be other than nine.

As illustrated in FIG. 7, no white portion of the sheet surrounds the determination patch JP and no color patch formed of white (W) is arranged adjacent to the determination patch JP in order to prevent an inability to properly measure a color due to an influence of a flare caused by light reflected from paper white in a white portion of the sheet or a color patch formed of white. In other words, color patches formed of other than white (W) are arranged around the determination patch JP. The unevenness in one sheet of the adjustment color chart CCA is evaluated by digitizing deviations among color values (colorimetric values) obtained by measuring the determination color patches JPA1 to JPA9 arranged in the nine positions as color differences. Similarly, the unevenness in one sheet of the adjustment color chart CCB is evaluated by digitizing deviations among color values (colorimetric values) obtained by measuring the determination color patches JPB1 to JPB9 arranged in the nine positions as color differences. A description is given in detail later of a method to evaluate (determine) the unevenness in one sheet of the adjustment color chart CCA (or the adjustment color chart CCB) using the color differences of the colorimetric values of the determination patches JPA1 to JPA9 (or the determination patches JPB1 to JPB9).

Returning to FIG. 4, the description of the functional configuration of the image forming system is continued. The profile acquisition unit 104 is a functional unit that acquires, via the communication unit 101, a profile generated by the information processing apparatus 20 executing the color matching processing using the colorimetric values (Lab values) of the adjustment color charts CCA and CCB. The profile acquisition unit 104 stores (registers) the acquired profile for the image forming apparatus 10 and for each sheet type in the storage unit 105. The profile stored in the storage unit 105 is applied to the control of the print output to a sheet performed by the print control unit 103. The profile acquisition unit 104 is implemented by, for example, the CPU 501 illustrated in FIG. 2 executing a program.

The storage unit 105 is a functional unit that stores the profile acquired by the profile acquisition unit 104, various data, programs, and the like. The storage unit 105 is implemented by the auxiliary memory 508 illustrated in FIG. 2.

Of the functional units of the image forming apparatus 10 illustrated in FIG. 4, at least a part of the functional units implemented by software (program) may be implemented by a hardware circuit such as a field-programmable gate array (FPGA) or an ASIC.

Further, each functional unit of the image forming apparatus 10 illustrated in FIG. 4 is a conceptual representation of a function, and the functional configuration of the image forming apparatus 10 is not limited thereto. For example, two or more of the functional units of the image forming apparatus 10 illustrated as independent units in FIG. 4 may be integrated into a single functional unit. By contrast, a plurality of functions provided by one functional unit of the image forming apparatus 10 illustrated in FIG. 4 may be divided and allocated to a plurality of functional units.

As illustrated in FIG. 4, the information processing apparatus 20 includes a communication unit 201 (an example of a read instruction unit), a chart transmission unit 202, a colorimetric value acquisition unit 203 (an acquisition unit), an identification unit 204, a patch acquisition unit 205, a calculation unit 206, a first determination unit 207, a profile generation unit 208 (a generation unit), a profile transmission unit 209 (a transmission unit), a second determination unit 210, an input unit 211, a display control unit 212, a display unit 213, and a storage unit 214.

The communication unit 201 is a functional unit that performs data communication with the image forming apparatus 10 and the image reading device 30 via the network N. The communication unit 201 is implemented by the network I/F 609 and the CPU 601 illustrated in FIG. 3 executing a program.

The chart transmission unit 202 is a functional unit that transmits, to the image forming apparatus 10 via the communication unit 201, a print job of color chart data based on which an adjustment color chart CC or a confirmation color chart is to be printed out by the image forming apparatus 10. The chart transmission unit 202 is implemented by, for example, the CPU 601 illustrated in FIG. 3 executing a program.

The colorimetric value acquisition unit 203 is a functional unit that acquires, from the image reading device 30 via the communication unit 201, color information data formed of colorimetric values (Lab values) of each color patch of the adjustment color chart CC and the confirmation color chart obtained by the image reading device 30 executing reading processing of the adjustment color chart CC and the confirmation color chart printed out by the image forming apparatus 10. The colorimetric value acquisition unit 203 is implemented by, for example, the CPU 601 illustrated in FIG. 3 executing a program.

The identification unit 204 is a functional unit that identifies color code information of each of the color codes CA and CB from the color information data of the adjustment color charts CCA and CCB acquired by the colorimetric value acquisition unit 203, digitizes (decodes) the color code information of each of the color codes CA and CB, and identifies the image forming apparatus 10 (device type, etc.), the sheet type, the sheet number of the adjustment color chart CC, the patch array of the adjustment color chart CC (the patch array of the color adjustment patch group CP), and the date and time of the print output. The identification unit 204 executes the same processing described above for the color code of the confirmation color chart. The identification unit 204 is implemented by, for example, the CPU 601 illustrated in FIG. 3 executing a program.

The patch acquisition unit 205 is a functional unit that identifies parts corresponding to the determination patches JPA1 to JPA9 and JPB1 to JPB9 embedded at the nine positions in each of the color adjustment patch groups CPA and CPB from the color information data of the adjustment color charts CCA and CCB acquired by the colorimetric value acquisition unit 203, and acquires colorimetric values (Lab values) of the patches P1 to P4 in each of the determination patches JPA1 to JPA9 and JPB1 to JPB9. The patch acquisition unit 205 is implemented by, for example, the CPU 601 illustrated in FIG. 3 executing a program.

The calculation unit 206 is a functional unit that calculates an average value or the like of the colorimetric values of the patches P1 to P4 in each of the determination patches JPA1 to JPA9 and JPB1 to JPB9 acquired by the patch acquisition unit 205. Specifically, assuming that the colorimetric values (Lab values) of the patch P1 of each of the determination patches JPA1 to JPA9 of the adjustment color chart CCA are values of (L*A1_1, a*A1_1, b*A1_1), (L*A1_2, a*A1_2, b*A1_2), . . . , and (L*A1_9, a*A1_9, b*A1_9), the calculation unit 206 calculates an average colorimetric value of (L*A1_ave, a*A1_ave, b*A1_ave) which is an average value of the colorimetric values of the patch P1 of each of the determination patches JPA1 to JPA9 by using the following formula (1).

$$L^*A1\_ave = \frac{1}{9}\sum_{i=1}^{9} L^*A1\_i,\ a^*\_A1\_ave = \frac{1}{9}\sum_{i=1}^{9} a^*\_A1\_i, \quad \text{Formula (1)}$$

$$b^*\_A1\_ave = \frac{1}{9}\sum_{i=1}^{9} b^*\_A1\_i$$

Further, assuming that the colorimetric values (Lab values) of the patch P1 of each of the determination patches JPB1 to JPB9 of the adjustment color chart CCB are values of (L*B1_1, a*B1_1, b*B1_1), (L*B1_2, a*B1_2, b*B1_2), . . . , and (L*B1_9, a*B1_9, b*B1_9), the calculation unit 206 calculates an average colorimetric value of (L*B1_ave, a*B1_ave, b*B1_ave) which is an average value of the colorimetric values of the patch P1 of each of the determination patches JPB1 to JPB9 by using the following formula (2).

$$L^*B1\_ave = \frac{1}{9}\sum_{i=1}^{9} L^*B1\_i,\ a^*\_B1\_ave = \frac{1}{9}\sum_{i=1}^{9} a^*\_B1\_i, \quad \text{Formula (2)}$$

$$b^*\_B1\_ave = \frac{1}{9}\sum_{i=1}^{9} b^*\_B1\_i$$

Next, the calculation unit 206 calculates respective color differences ΔEA1_1 to ΔEA1_9 between the values of (L*A1_1, a*A1_1, b*A1_1) to (L*A1_9, a*A1_9, b*A1_9) which are the colorimetric values (Lab values) of the patch P1 of each of the determination patches JPA1 to JPA9 of the adjustment color chart CCA and the calculated average colorimetric value of (L*A1_ave, a*A1_ave, b*A1_ave). As a formula for calculating a color difference, for example, ΔE2000 which has a high affinity with human senses may be used, or ΔE76 or ΔE94 which is easier to calculate may be used. Then, the calculation unit 206 determines the maximum value ΔEA1_Max among the calculated color differences ΔEA1_1 to ΔEA1_9. Similarly, the calculation unit 206 determines the respective maximum values ΔEA2_Max to ΔEA4_Max using the colorimetric values (Lab values) of the patches P2 to P4 of each of the determination patches JPA1 to JPA9. In other words, the maximum values ΔEA1_Max to ΔEA4_Max determined by the calculation unit 206 are regarded as deviations in one sheet of the adjustment color chart CCA.

Further, the calculation unit 206 calculates respective color differences ΔEB1_1 to ΔEB1_9 between the values of (L*B1_1, a*B1_1, b*B1_1) to (L*B1_9, a*B1_9, b*B1_9) which are the colorimetric values (Lab values) of the patch P1 of each of the patches JPB1 to JPB9 of the adjustment color chart CCB and the calculated average colorimetric value of (L*B1_ave, a*B1_ave, b*B1_ave). Then, the calculation unit 206 determines the maximum value ΔEB1_Max among the calculated color differences ΔEB1_1 to ΔEB1_9. Similarly, the calculation unit 206 determines the respective maximum values ΔEB2_Max to ΔEB4_Max using the colorimetric values (Lab values) of the patches P2 to P4 of each of the determination patches JPB1 to JPB9. In other words, the maximum values ΔEB1_Max to ΔEB4_Max determined by the calculation unit 206 are regarded as deviations in one sheet of the adjustment color chart CCB. The deviations in one sheet of the adjustment color chart CC are referred to as "in-sheet deviations" and one thereof is referred to as an "in-sheet deviation."

Further, the calculation unit 206 calculates a difference ΔE1_AB between the average colorimetric value of (L*A1_ave, a*A1_ave, b*A1_ave) of the adjustment color chart CCA and the average colorimetric value of (L*B1_ave, a*B1_ave, b*B1_ave) of the adjustment color chart CCB. Similarly, the calculation unit 206 calculates the respective differences ΔE2_AB to ΔE4_AB using the colorimetric values (Lab values) of the patches P2 to P4 of each of the determination patches JPA1 to JPA9 and JPB1 to JPB9. In other words, the differences ΔE1_AB to ΔE4_AB calculated by the calculation unit 206 are regarded as deviations between the sheets of the adjustment color chart CCA and the adjustment color chart CCB. The deviations between the sheets of the adjustment color chart CCA and the adjustment color chart CCB are referred to as "inter-sheet deviations" and one thereof is referred to as an "inter-sheet deviation."

The calculation unit 206 is implemented by, for example, the CPU 601 illustrated in FIG. 3 executing a program.

The first determination unit 207 is a functional unit that performs determination (preliminary determination) (first determination) regarding unevenness of the adjustment color chart CC based on each value calculated by the calculation unit 206. First, the first determination unit 207 determines whether each of the maximum values ΔEA1_Max to ΔEA4_Max (the in-sheet deviations) determined by the calculation unit 206 is equal to or greater than a predetermined threshold value "Thresh" according to the following formula (3). Similarly, the first determination unit 207 determines whether each of the maximum values ΔEB1_Max to ΔEB4_Max (the in-sheet deviations) determined by the calculation unit 206 is equal to or greater than the predetermined threshold value "Thresh" by adapting the following formula (3).

$$\begin{cases} \Delta EA1\_Max \geq Thesh \\ \Delta EA2\_Max \geq Thesh \\ \Delta EA3\_Max \geq Thesh \\ \Delta EA4\_Max \geq Thesh \end{cases} \quad \text{Formula (3)}$$

Further, the first determination unit 207 determines whether each of the differences ΔE1_AB to ΔE4_AB (the inter-sheet deviations) calculated by the calculation unit 206 is equal to or greater than a predetermined threshold value "Thresh2" according to the following formula (4).

$$\begin{cases} \Delta E1\_AB \geq Thresh2 \\ \Delta E2\_AB \geq Thresh2 \\ \Delta E3\_AB \geq Thresh2 \\ \Delta E4\_AB \geq Thresh2 \end{cases} \quad \text{Formula (4)}$$

In a case where at least one of the maximum values ΔEA1_Max to ΔEA4_Max in the formula (3) is satisfied, the first determination unit 207 determines that there is unevenness in one sheet of the color adjustment patch group CPA included in the adjustment color chart CCA. Similarly, in a case where at least one of the maximum values ΔEB1_Max to ΔEB4_Max in the formula (3) is satisfied, the first determination unit 207 determines that there is unevenness in one sheet of the color adjustment patch group CPB included in the adjustment color chart CCB. In addition, in a case where at least one of the differences ΔE1_AB to ΔE4_AB in the formula (4) is satisfied, the first determination unit 207 determines that there is unevenness between the sheets of the adjustment color charts CCA and CCB. In the formula (3), the predetermined threshold value "Thresh" is not necessarily the same for the maximum values ΔEA1_Max to ΔEA4_Max (the maximum values ΔEB1_Max to ΔEB4_Max), and may vary for at least one of the maximum values ΔEA1_Max to ΔEA4_Max (the maximum values ΔEB1_Max to ΔEB4_Max). In the formula (4), the threshold value "Thresh2" is not necessarily the same for the differences ΔE1_AB to ΔE4_AB, and may vary for at least one of the differences ΔE1_AB to ΔE4_AB.

The first determination unit 207 determines whether to continue the color matching processing for the image forming apparatus 10 identified by the identification unit 204 based on the determination results of the in-sheet deviations and the inter-sheet deviation for the adjustment color charts CCA and CCB. The first determination unit 207 is implemented by, for example, the CPU 601 illustrated in FIG. 3 executing a program.

The profile generation unit 208 is a functional unit that generates a profile by using the colorimetric value of each patch corresponding to the color adjustment patch group CP included in the color information data of the adjustment color charts CCA and CCB in a case where the first determination unit 207 determines to continue the color matching processing for the image forming apparatus 10 identified by the identification unit 204. Specifically, since the color value of each patch in the color chart data of the adjustment color charts CCA and CCB is known in advance, the profile generation unit 208 generates the profile by executing known color matching processing to approximate the colorimetric value of each patch corresponding to the color adjustment patch groups CPA and CPB to the color value of each patch in the color chart data of the adjustment color charts CCA and CCB. The profile generation unit 208 is implemented by, for example, the CPU 601 illustrated in FIG. 3 executing a program.

The profile transmission unit 209 is a functional unit that transmits the profile generated by the profile generation unit 208 to the image forming apparatus 10 identified by the identification unit 204 via the communication unit 201. Then, the profile transmission unit 209 receives, from the image forming apparatus 10 via the communication unit 201, a notification indicating that the profile is successfully registered. The profile transmission unit 209 is implemented by, for example, the CPU 601 illustrated in FIG. 3 executing a program.

The second determination unit 210 is a functional unit that performs determination (posterior determination) (second determination) regarding an average deviation and a maximum deviation in comparison with a print standard such as "Japan Color," "G7," or "Fogra" using the color information data of the confirmation color chart acquired by the colorimetric value acquisition unit 203. The second determination unit 210 is implemented by, for example, the CPU 601 illustrated in FIG. 3 executing a program.

The input unit 211 is a functional unit that receives an input operated by a user. The input unit 211 is implemented by the keyboard 611 and the mouse 612 illustrated in FIG. 3.

The display control unit 212 is a functional unit that controls the display unit 213 (the display 608) to display various screens (such as a color adjustment screen 1000 to be described later) and information. The display control unit 212 is implemented by, for example, the CPU 601 illustrated in FIG. 3 executing a program.

The display unit 213 is a functional unit that displays the various screens and the information under the control of the display control unit 212. The display unit 213 is implemented by the display 608 illustrated in FIG. 3.

The storage unit 214 is a functional unit that stores the color chart data, the profile generated by the profile generation unit 208, and the like. The storage unit 214 is implemented by the auxiliary memory 605 illustrated in FIG. 3.

Of the functional units of the information processing apparatus 20 illustrated in FIG. 4, at least a part of the functional units implemented by software (program) may be implemented by a hardware circuit such as an FPGA or an ASIC.

Further, each functional unit of the information processing apparatus 20 illustrated in FIG. 4 is a conceptual representation of a function, and the functional configuration of the information processing apparatus 20 is not limited thereto. For example, two or more of the functional units of the information processing apparatus 20 illustrated as independent units in FIG. 4 may be integrated into a single functional unit. By contrast, a plurality of functions provided by one functional unit of the information processing apparatus 20 illustrated in FIG. 4 may be divided and allocated to a plurality of functional units.

Color Adjustment Screen of Information Processing Apparatus

Figure 8:
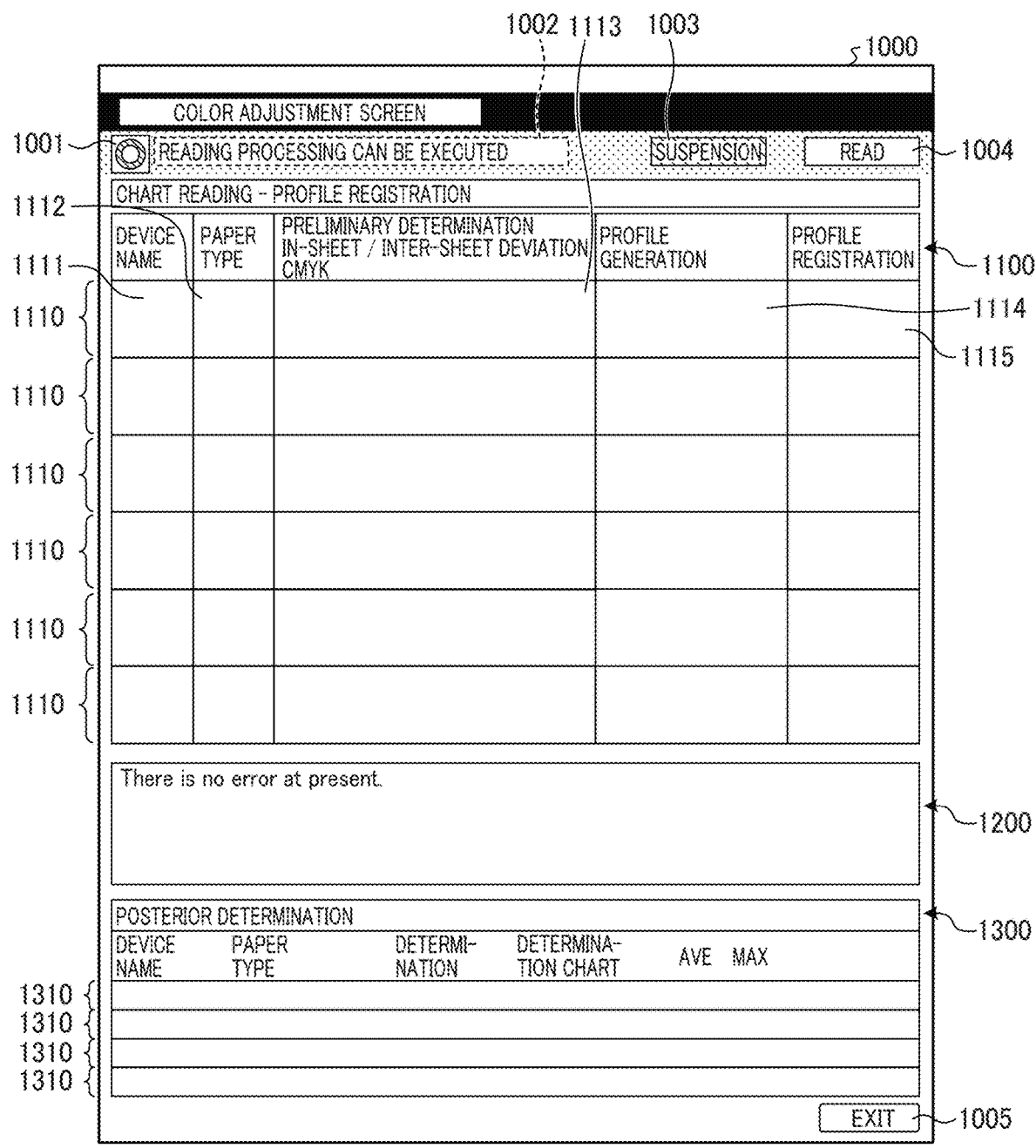
FIG. 8 is a diagram illustrating an example of a color adjustment screen in an initial state according to one embodiment of the present disclosure.
Figure 10:
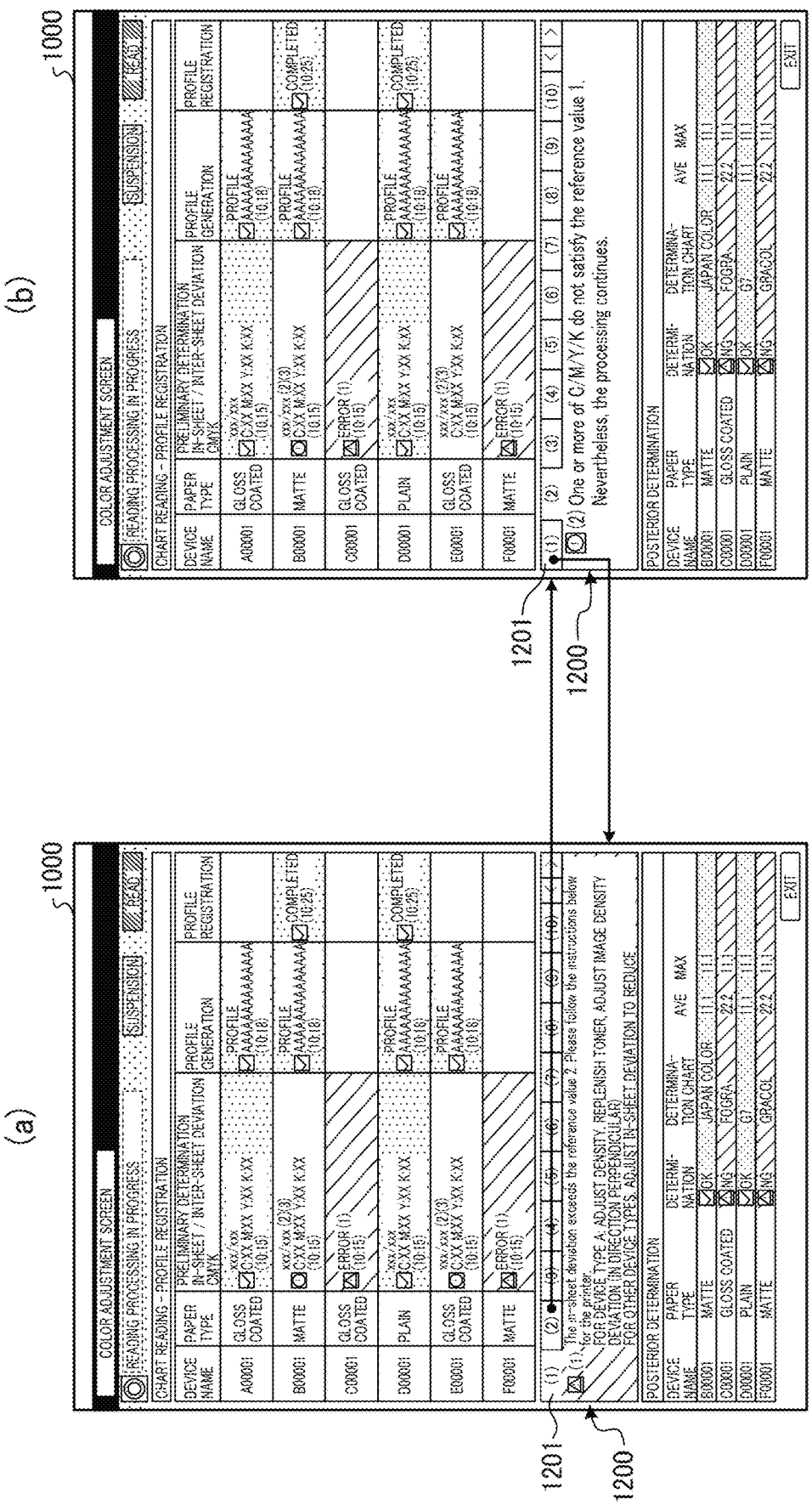
FIG. 10 is a diagram illustrating an operation of checking an abnormality or warning message on the color adjustment screen according to one embodiment of the present disclosure.

FIG. 8 is a diagram illustrating an example of a color adjustment screen in an initial state according to the present embodiment. FIG. 9 is a diagram illustrating an example of the color adjustment screen when color matching processing is in progress according to the present embodiment. FIG. 10 is a diagram illustrating an operation of checking an abnormality or warning message on the color adjustment screen according to the present embodiment. A description is given of the color adjustment screen 1000 displayed on the information processing apparatus 20 according to the present embodiment with reference to FIGS. 8 to 10.

The color adjustment screen 1000 illustrated in FIG. 8 is a screen displayed on the display unit 213 under the control of the display control unit 212 in accordance with an input to the input unit 211 operated by the user. The color adjustment screen 1000 is a screen for displaying a progress status of color matching processing to be executed by the image forming system 1.

As illustrated in FIG. 8, the color adjustment screen 1000 includes a status mark 1001, a message section 1002, a suspension button 1003, a read button 1004, a color matching progress area 1100, a message display area 1200, a posterior determination area 1300, and an exit button 1005.

The status mark 1001 is a mark that indicates an operating state of the information processing apparatus 20 and the image reading device 30. For example, the status mark 1001 indicates a state of standby, a state of reading processing or color matching processing being executed by the image reading device 30, or a state of suspension by changing the color of the status mark 1001.

The message section 1002 is a display area in which a message indicating the operating state of the information processing apparatus 20 and the image reading device 30 in accordance with the status mark 1001 is displayed.

The suspension button 1003 is a button for suspending the color matching processing being executed by the image forming system 1. The read button 1004 is a button for causing the image reading device 30 to execute reading processing of a color chart. The exit button 1005 is a button for ending the color matching processing and returning to a top screen 2000 to be described later.

The color matching progress area 1100 is a display area in which a progress status of color matching processing to be executed by the image forming system 1 for the individual image forming apparatus 10 and for each sheet type is displayed. The progress status of the color matching processing for the individual image forming apparatus 10 and for each sheet type is separately displayed in an individual color matching progress record 1110 of the color matching progress area 1100. The individual color matching progress record 1110 includes a device name cell 1111, a sheet type cell 1112, a preliminary determination cell 1113, a profile generation cell 1114, and a profile registration cell 1115. Since the color adjustment screen 1000 illustrated in FIG. 8 is a screen in an initial state before execution of the color matching processing, no information is displayed in any cells of the color matching progress record 1110.

The device name cell 1111 is a cell in which the device name of the image forming apparatus 10 identified with the color code of the adjustment color chart CC is displayed. Here, the cell is a display area of the color matching progress record 1110, in which a progress status of the color matching processing for the individual image forming apparatus 10 and for each sheet type is displayed sequentially in stages. The sheet type cell 1112 is a cell in which the sheet type identified with the color code of the adjustment color chart CC is displayed. When the device name of the image forming apparatus 10 and the sheet type are identified by the identification unit 204 with the color code of either the adjustment color chart CCA or CCB, the display control unit 212 respectively displays the device name of the image forming apparatus 10 and the sheet type in the device name cell 1111 and the sheet type cell 1112 of the color matching progress record 1110 which is blank. As a result, the display of progress of the color matching processing corresponding to the identified device name of the image forming apparatus 10 and the identified sheet type starts. In other words, the display of the device name in the device name cell 1111 and the sheet type in the sheet type cell 1112 represents that the adjustment color chart CC has been read by the image reading device 30. For example, "GLOSS COATED," "MATTE," and "PLAIN" are displayed as examples of the sheet type in FIG. 9.

The preliminary determination cell 1113 is a cell in which determination results (in-sheet deviations, inter-sheet deviation, and the like) of the preliminary determination for the adjustment color charts CCA and CCB performed by the first determination unit 207 are displayed as a progress status. As illustrated in FIG. 9, when the determination results of the preliminary determination performed by the first determination unit 207 are obtained, the display control unit 212 displays the in-sheet deviations and the inter-sheet deviation which are the determination results of the preliminary determination for the adjustment color charts CCA and CCB, a device value (CMYK value) at the time of determination, and the time at the time of determination. In addition, as illustrated in FIG. 9, when the first determination unit 207 determines that the determination results for the adjustment color charts CCA and CCB are normal, the display control unit 212 displays a normal completion mark 1121 representing a normal state in the preliminary determination cell 1113 together with the determination results, and displays the entire preliminary determination cell 1113, for example, in green. Further, as illustrated in FIG. 9, when the first determination unit 207 determines that the determination results for the adjustment color charts CCA and CCB are not normal but that the determination results do not hinder profile generation in the subsequent processing, the display control unit 212 displays a warning mark 1122 representing a cautious state together with the determination results and a number (e.g., "(2)," "(3)," etc.) that indicates the type of the warning in the preliminary determination cell 1113. The display control unit 212 may highlight a determination result that is not normal (e.g., a device value that is not normal) of the determination results. Furthermore, as illustrated in FIG. 9, when the first determination unit 207 determines that the determination results for the adjustment color charts CCA and CCB are abnormal, the display control unit 212 displays an abnormality mark 1123 representing an abnormal state in the preliminary determination cell 1113 together with the determination results. In this case, the display control unit 212 displays the entire preliminary determination cell 1113, for example, in red (i.e., in a color different from a color used for representing a normal state), and displays a number (e.g., "(1)," etc.) that indicates the type of the abnormality in the preliminary determination cell 1113. Note that, in case of an abnormal state to the extent that the in-sheet deviations or the inter-sheet deviation cannot be calculated (e.g., occurrence of a sheet jam), the display control unit 212 does not necessarily display the in-sheet deviations and the inter-sheet deviation as the determination results of the preliminary determination.

The profile generation cell 1114 is a cell in which a result of profile generation performed by the profile generation unit 208 is displayed as a progress status. As illustrated in FIG. 9, when a profile is successfully generated by the profile generation unit 208, the display control unit 212 displays the normal completion mark 1121 representing a normal state in the profile generation cell 1114 and displays, for example, a name of the profile, a description of the profile, and a time of profile generation in the profile generation cell 1114. In this case, the display control unit 212 displays the entire profile generation cell 1114, for example, in green. In a case where an abnormality occurs in the profile generation performed by the profile generation unit 208, the display control unit 212 displays the abnormality mark 1123 representing an abnormal state, a time of occurrence of the abnormality, and a number indicating the type of the abnormality in the profile generation cell 1114. In this case, the display control unit 212 displays the entire profile generation cell 1114, for example, in red.

The profile registration cell 1115 is a cell in which a result of registration of a profile in a target image forming apparatus 10 after the profile is transmitted by the profile transmission unit 209 to the target image forming apparatus 10 is displayed as a progress status. As illustrated in FIG. 9, when the profile is successfully registered in the target image forming apparatus 10, the display control unit 212 displays the normal completion mark 1121 representing a normal state in the profile registration cell 1115, and displays, for example, a time of registration of the profile in the profile registration cell 1115. In this case, the display control unit 212 displays the entire profile registration cell 1115, for example, in green. In a case where an abnormality occurs in the registration of the profile in the target image forming apparatus 10 (e.g., a case where a notification indicating completion of the registration of the profile is not returned even though the profile has been transmitted), the display control unit 212 displays the abnormality mark 1123 representing an abnormal state, a time of occurrence of the abnormality, and a number indicating the type of the abnormality in the profile registration cell 1115. In this case, the display control unit 212 displays the entire profile registration cell 1115, for example, in red.

As described above, the progress status of each stage of the processing such as the reading processing of the adjustment color chart CC, the preliminary determination performed by the first determination unit 207, the profile generation performed by the profile generation unit 208, and the profile registration performed in the image forming apparatus 10 is displayed sequentially in stages in the color matching progress record 1110 corresponding to the individual image forming apparatus 10 and each sheet type. As illustrated in FIG. 9, in a case where any stage of the processing has not been successfully completed, nothing is displayed in the cell that presents the progress status of the subsequent stage of the processing. As a result, since the progress statuses of the color matching processing for the individual image forming apparatuses 10 in the stages are collectively grasped, the color matching processing for the individual image forming apparatuses 10 can be executed without individually checking the progress of the color matching processing for the individual image forming apparatuses 10. Thus, the workability of color matching processing and the manageability of data of color matching result are increased.

Further, in the color matching processing for the individual image forming apparatus 10 and for each sheet type, in a case where the color matching processing at each of the stages has been successfully completed or has caused occurrence of a warning, the color matching processing proceeds to the next stage of the color matching processing, and in a case where the color matching processing at each of the stages has caused occurrence of an abnormality, the color matching processing does not proceed to the next stage of the color matching processing but stops at the stage where the abnormality has occurred.

Returning to FIGS. 8 to 10, the description of the color adjustment screen 1000 is continued. The message display area 1200 is an area in which a message is displayed in a case where a warning or abnormality occurs in the color matching processing for the individual image forming apparatus 10 and for each sheet type. Examples of the message include, for example, a cause of occurrence of the warning or abnormality, a specific content of the warning or abnormality, and a treatment method for resolving the warning or abnormality. Further, as illustrated in FIG. 9, the message display area 1200 includes a tab 1201 on which numbers indicating the types of warning or abnormality are displayed.

Assuming that a warning or abnormality occurs in the color matching processing for the individual image forming apparatus 10, when the user presses the tab 1201 on which a number indicating the type of warning or abnormality displayed, the display control unit 212 displays a message corresponding to the warning or abnormality indicated by the number in the message display area 1200. In the example illustrated in FIG. 9, a state of the tab 1201 on which the number "(1)" indicating the type of abnormality displayed is pressed is illustrated. In this state, when the tab 1201 on which the number "(2)" indicating the type of warning displayed is pressed, the display control unit 212 displays a message corresponding to the warning indicated by the number "(2)" in the message display area 1200 as illustrated in FIG. 10. As described above, in the case where the warning or abnormality occurs in the color matching processing, the user can check a message corresponding to the warning or abnormality by pressing the tab 1201 on which a corresponding number is displayed. Thus, the user can grasp a cause of occurrence of the warning or abnormality, a specific content of the warning or abnormality, and a treatment method for resolving the warning or abnormality.

The posterior determination area 1300 is a display area in which a determination result of the posterior determination for the confirmation color chart performed by the second determination unit 210 is displayed. The determination result of the posterior determination for the individual image forming apparatus 10 and for each sheet type is separately displayed in an individual posterior determination record 1310. Since the color adjustment screen 1000 illustrated in FIG. 8 is a screen in an initial state before execution of the color matching processing, no information is displayed in the posterior determination area 1300.

As illustrated in FIG. 9, when the determination result of the posterior determination performed by the second determination unit 210 is obtained, the display control unit 212 displays the device name of the image forming apparatus 10 and the sheet type corresponding to the determination result of the posterior determination, whether the determination result is normal or abnormal, a determination chart (print standard) to be compared, the average deviation, and the maximum deviation in the posterior determination record 1310. The display control unit 212 may display a mark similar to the above-described normal completion mark 1121 when the second determination unit 210 determines that the determination result of the posterior determination is normal, and may display a mark similar to the above-described abnormality mark 1123 when the second determination unit 210 determines that the determination result of the posterior determination is abnormal. As a result, since the determination results of the posterior determination for the individual image forming apparatuses 10 can be collectively grasped and it is not necessary to work while individually checking the progresses of the posterior determination for the individual image forming apparatuses 10, the workability of color matching processing and the manageability of data of color matching result are increased.

Overall Processing to be Executed by Image Forming System

Figure 11:
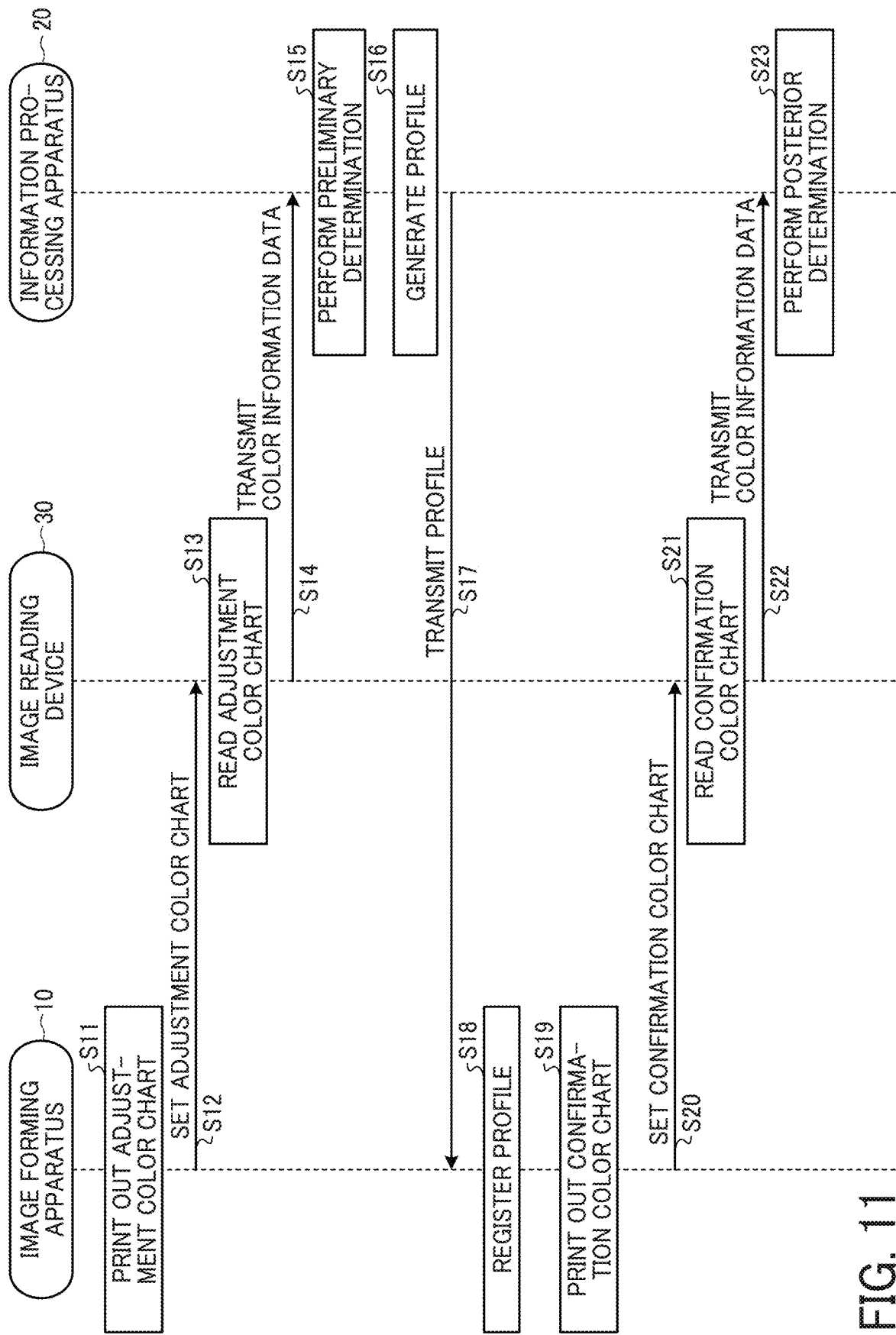
FIG. 11 is a sequence chart illustrating an example of overall processing to be executed by the image forming system according to one embodiment of the present disclosure.

FIG. 11 is a sequence chart illustrating an example of overall processing to be executed by the image forming system according to the present embodiment. A description is given of the overall processing to be executed by the image forming system 1 according to the present embodiment with reference to FIG. 11.

Step S11

The user performs an operation for printing out the adjustment color charts CCA and CCB via the control panel 510 included in the image forming apparatus 10. Accordingly, the job acquisition unit 102 acquires a print job of color chart data of the adjustment color charts CCA and CCB from the chart transmission unit 202 included in the information processing apparatus 20. Alternatively, the job acquisition unit 102 may generate the print job by acquiring the color chart data of the adjustment color charts CCA and CCB stored in the image forming apparatus 10. Then, the print control unit 103 causes the plotter 531 to print out the adjustment color charts CCA and CCB based on the print job of the color chart data acquired by the job acquisition unit 102.

Step S12

The user sets the adjustment color charts CCA and CCB printed out by the image forming apparatus 10 on the image reading device 30.

Step S13

The user operates the image reading device 30 to execute reading processing of the adjustment color charts CCA and CCB set on the image reading device 30 to generate color information data by converting read values of the adjustment color charts CCA and CCB read by the image reading device 30 into colorimetric values. The reading processing to be executed by the image reading device 30 may be executed by an operation on a screen displayed on the information processing apparatus 20 as described later.

Step S14

The image reading device 30 transmits the color information data of the adjustment color charts CCA and CCB generated by the image reading device 30 to the information processing apparatus 20. The communication unit 201 included in the information processing apparatus 20 receives the color information data.

Step S15

The colorimetric value acquisition unit 203 included in the information processing apparatus 20 acquires the color information data of the adjustment color charts CCA and CCB received by the communication unit 201. The identification unit 204 included in the information processing apparatus 20 identifies color code information of each of the color codes CA and CB from the color information data of the adjustment color charts CCA and CCB acquired by the colorimetric value acquisition unit 203, digitizes (decodes) the color code information of each of the color codes CA and CB, and identifies the image forming apparatus 10 (device type, etc.), the sheet type, the sheet number of the adjustment color chart CC, the patch array of the adjustment color chart CC (the patch array of the color adjustment patch group CP), and the date and time of the print output. Then, the display control unit 212 included in the information processing apparatus 20 respectively displays the device name of the image forming apparatus 10 and the sheet type identified by the identification unit 204 in the device name cell 1111 and the sheet type cell 1112 of the color matching progress record 1110 which is blank. Thus, the user can recognize completion of the reading processing of the adjustment color charts CCA and CCB.

Next, the patch acquisition unit 205 included in the information processing apparatus 20 identifies parts corresponding to the determination patches JPA1 to JPA9 and JPB1 to JPB9 embedded at the nine positions in each of the color adjustment patch groups CPA and CPB from the color information data of the adjustment color charts CCA and CCB acquired by the colorimetric value acquisition unit 203, and acquires colorimetric values (Lab values) of the patches P1 to P4 in each of the determination patches JPA1 to JPA9 and JPB1 to JPB9. Next, the calculation unit 206 included in the information processing apparatus 20 determines the respective maximum values $\Delta EA1\_Max$ to $\Delta EA4\_Max$ (the in-sheet deviations) and $\Delta EB1\_Max$ to $\Delta EB4\_Max$ (the in-sheet deviations), and the respective differences $\Delta E1\_AB$ to $\Delta E4\_AB$ (the inter-sheet deviations), using the colorimetric values of the patches P1 to P4 of the determination patches JPA1 to JPA9 and JPB1 to JPB9. Next, the first determination unit 207 included in the information processing apparatus 20 performs preliminary determination for the in-sheet deviations and the inter-sheet deviation calculated by the calculation unit 206.

Then, the display control unit 212 displays the determination results of the preliminary determination for the adjustment color charts CCA and CCB performed by the first determination unit 207 in the preliminary determination cell 1113 of a corresponding color matching progress record 1110. Thus, the user can recognize the determination results of the preliminary determination performed by the first determination unit 207.

Step S16

In a case where the first determination unit 207 determines that the determination results of the preliminary determination are normal (or cautious) and that the color matching processing for the image forming apparatus 10 can be continued, the profile generation unit 208 included in the information processing apparatus 20 generates a profile by using the colorimetric value of each patch corresponding to the color adjustment patch groups CPA and CPB included in the color information data of the adjustment color charts CCA and CCB. In other words, in a case where the first determination unit 207 determines that the determination results of the preliminary determination is not abnormal, an operation of generating the profile is proceeded by the profile generation unit 208. Then, the display control unit 212 displays an indication indicating that the profile is successfully generated by the profile generation unit 208 in the profile generation cell 1114 of a corresponding color matching progress record 1110. Thus, the user can recognize that the profile is generated by the profile generation unit 208.

Step S17

The profile transmission unit 209 included in the information processing apparatus 20 transmits the profile generated by the profile generation unit 208 to the image forming apparatus 10 identified by the identification unit 204 via the communication unit 201. The communication unit 101 included in the image forming apparatus 10 receives the profile.

Step S18

The profile acquisition unit 104 included in the image forming apparatus 10 acquires the profile received by the communication unit 101 from the information processing apparatus 20. The profile acquisition unit 104 stores (registers) the acquired profile for the image forming apparatus 10 and for each sheet type in the storage unit 105. Then, the profile acquisition unit 104 transmits a notification indicating that the profile is successfully registered to the information processing apparatus 20 via the communication unit 101.

In response to receiving the notification indicating that the profile is successfully registered in the target image forming apparatus 10 via the communication unit 201, the display control unit 212 included in the information processing apparatus 20 displays an indication indicating that the profile is successfully registered in the profile registration cell 1115 of a corresponding color matching progress record 1110. Thus, the user can recognize that the profile generated by the profile generation unit 208 is registered in the image forming apparatus 10.

Step S19

The user performs an operation for printing out the confirmation color chart via the control panel 510 included in the image forming apparatus 10. Accordingly, the job acquisition unit 102 acquires a print job of color chart data of the confirmation color chart from the chart transmission unit 202 included the information processing apparatus 20. Alternatively, the job acquisition unit 102 may generate the print job by acquiring the color chart data of the confirmation color chart stored in the image forming apparatus 10. Then, the print control unit 103 causes the plotter 531 to print out the confirmation color chart by applying the profile registered in step S18 based on the print job of the color chart data acquired by the job acquisition unit 102.

Step S20

The user sets the confirmation color chart printed out by the image forming apparatus 10 on the image reading device 30.

Step S21

The user operates the image reading device 30 to execute reading processing of the confirmation color chart set on the image reading device 30 to generate color information data by converting read values of the confirmation color chart read by the image reading device 30 into colorimetric values. The reading processing to be executed by the image reading device 30 may be executed by an operation on a screen displayed on the information processing apparatus 20 as described later.

Step S22

The image reading device 30 transmits the color information data of the confirmation color chart generated by the image reading device 30 to the information processing apparatus 20. The communication unit 201 included in the information processing apparatus 20 receives the color information data.

Step S23

The colorimetric value acquisition unit 203 acquires the color information data of the confirmation color chart received by the communication unit 201. The identification unit 204 identifies color code information of the color code from the color information data of the confirmation color chart acquired by the colorimetric value acquisition unit 203, digitizes (decodes) the color code information of the color code, and identifies the image forming apparatus 10 (device type, etc.), the sheet type, the patch array of the confirmation color chart, and the date and time of the print output.

Next, the patch acquisition unit 205 acquires a colorimetric value (Lab value) of each patch forming the confirmation color chart from the color information data acquired by the colorimetric value acquisition unit 203. Next, the second determination unit 210 performs posterior determination regarding the average deviation and the maximum deviation in comparison with a print standard such as "Japan Color," "G7," or "Fogra" using the colorimetric value of each patch forming the confirmation color chart acquired by the patch acquisition unit 205.

Then, the display control unit 212 displays the determination result of the posterior determination for the confirmation color chart performed by the second determination unit 210 in a corresponding posterior determination record 1310. Thus, the user can recognize the determination result of the posterior determination performed by the second determination unit 210. In a case where the second determination unit 210 determines that the determination result of the posterior determination is normal, the profile registered in step S18 is applied to control of printing to be executed by the target image forming apparatus 10 on the target sheet type.

Screen Transition Performed by Information Processing Apparatus

Figure 12:
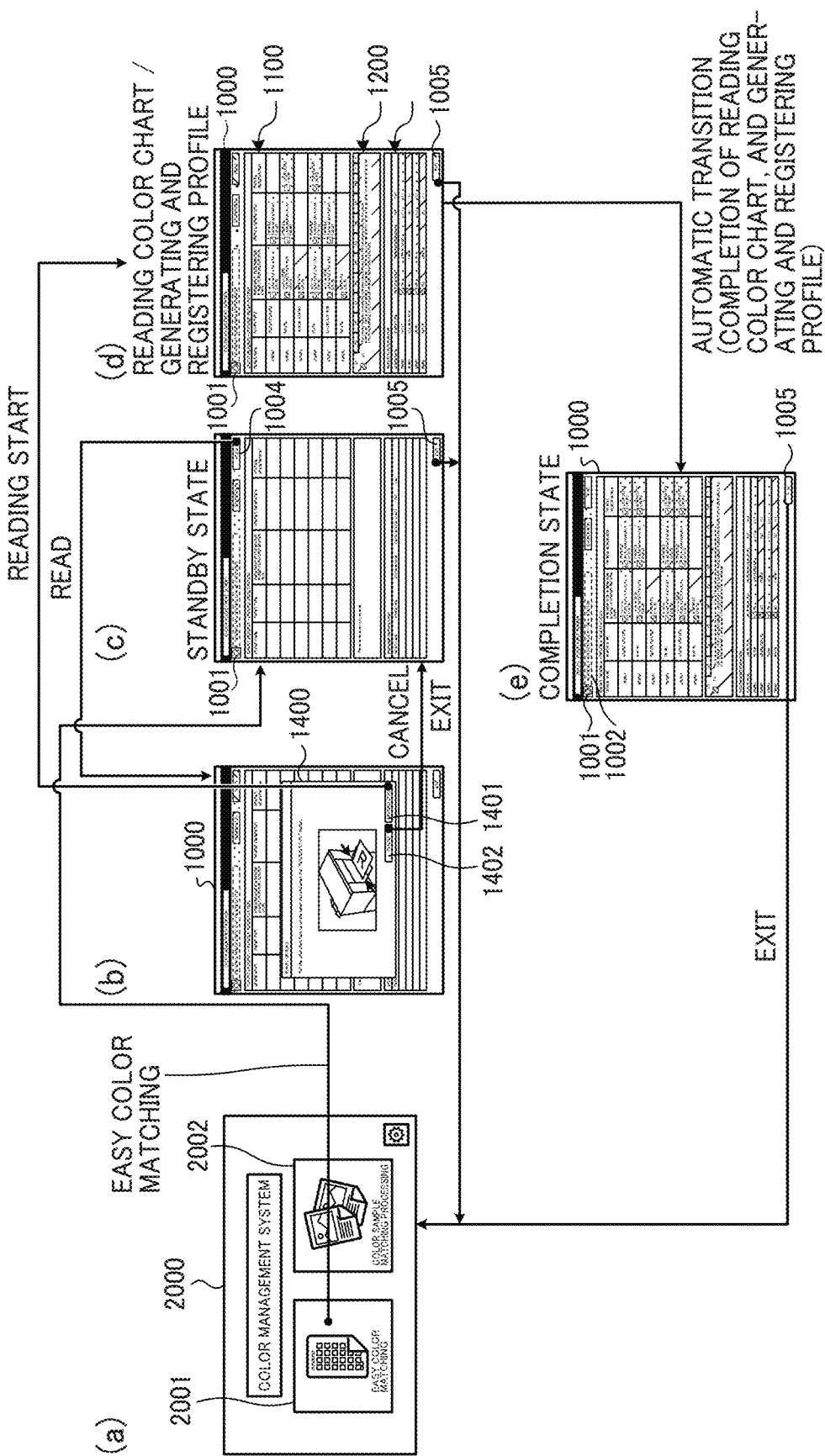
FIG. 12 is a diagram illustrating an example of a normal screen transition performed by the information processing apparatus according to one embodiment of the present disclosure.
Figure 13:
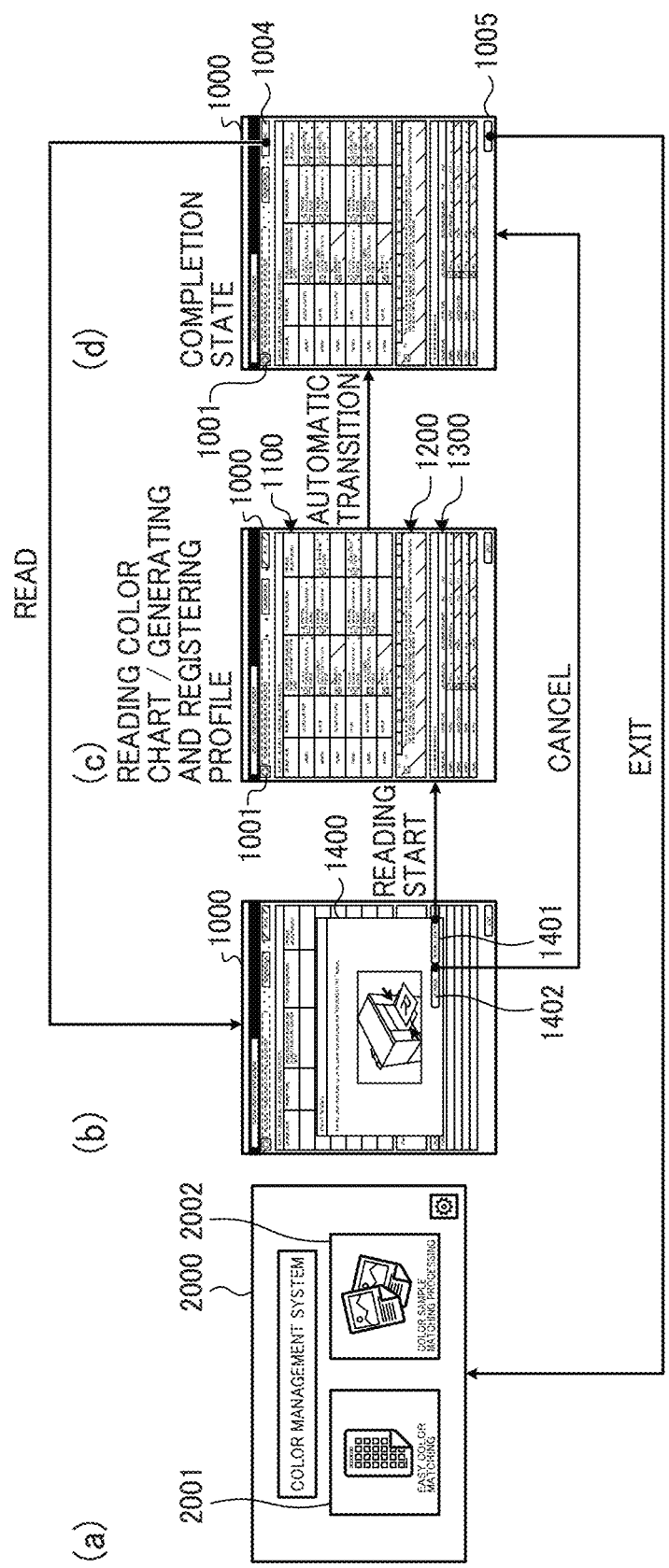
FIG. 13 is a diagram illustrating an example of a screen transition performed by the information processing apparatus in case of additional reading processing according to one embodiment of the present disclosure.

FIG. 12 is a diagram illustrating an example of a normal screen transition performed by the information processing apparatus according to the present embodiment. FIG. 13 is a diagram illustrating an example of a screen transition performed by the information processing apparatus in case of additional reading processing according to the present embodiment. A description is given of the screen transitions displayed on the display unit 213 included in the information processing apparatus 20 according to the present embodiment with reference to FIGS. 12 and 13.

When a program is activated by the CPU 601 included in the information processing apparatus 20, first, the display control unit 212 displays the top screen 2000 illustrated in part (a) of FIG. 12 on the display unit 213. The top screen 2000 is a screen for selecting to start either easy color matching processing or color sample matching processing. The top screen 2000 includes an easy color matching button 2001 and a color sample matching button 2002.

The easy color matching button 2001 is a button for executing the easy color matching processing (in this example, the color matching processing). The color sample matching button 2002 is a button for executing the color sample matching processing.

When the user presses the easy color matching button 2001, the display control unit 212 displays the color adjustment screen 1000 in a state of standby illustrated in part (c) of FIG. 12. Since the color adjustment screen 1000 illustrated in part (c) of FIG. 12 is a screen in an initial state before execution of the easy color matching processing, no information is displayed in any cells of the color matching progress record 1110. When the user presses the exit button

1005 on the color adjustment screen 1000, the display control unit 212 displays the top screen 2000 illustrated in part (a) of FIG. 12. When the user presses the read button 1004 on the color adjustment screen 1000, the display control unit 212 displays a read dialog box 1400 illustrated in part (b) of FIG. 12.

In a case where the easy color matching button 2001 on the top screen 2000 is pressed, it is usually assumed that the reading processing of the adjustment color charts CCA, CCB, or the confirmation color chart is started. For this reason, in the case where the easy color matching button 2001 is pressed, the processing may directly transition to the read dialog box 1400 illustrated in part (b) of FIG. 12.

The read dialog box 1400 illustrated in part (b) of FIG. 12 is a dialog box for causing the image reading device 30 to execute the reading processing of the adjustment color charts CCA, CCB, or the confirmation color chart. The read dialog box 1400 includes a reading start button 1401 and a cancel button 1402. The reading start button 1401 is a button for causing the image reading device 30 to start the reading processing of the adjustment color chart CCA, CCB, or the confirmation color chart. The cancel button 1402 is a button for returning to the color adjustment screen 1000 illustrated in part (c) of FIG. 12 without causing the image reading device 30 to execute the reading processing.

When the user presses the reading start button 1401, the display control unit 212 displays the color adjustment screen 1000 illustrated in part (d) of FIG. 12 and the communication unit 201 transmits an instruction to start the reading processing to the image reading device 30. Accordingly, the color matching processing is executed from step S13 illustrated in FIG. 11. As illustrated in part (d) of FIG. 12, on the color adjustment screen 1000, the progress status of each stage of the processing such as the reading processing of the adjustment color chart CC, the preliminary determination performed by the first determination unit 207, the profile generation performed by the profile generation unit 208, and the profile registration performed in the image forming apparatus 10 is displayed sequentially in stages in the color matching progress record 1110 corresponding to the individual image forming apparatus 10 and each sheet type in accordance with the progress of the color matching processing as described above with reference to FIG. 9. In this state, when the user presses the exit button 1005 on the color adjustment screen 1000, the color matching processing is suspended and the display control unit 212 displays the top screen 2000 illustrated in part (a) of FIG. 12.

When the color matching processing for the individual image forming apparatus 10 and for each sheet type on the color adjustment screen 1000 illustrated in part (d) of FIG. 12 advances and the color matching processing is completed for all the individual image forming apparatuses 10 and all the sheet types (normally or abnormally), the color adjustment screen 1000 transitions to a state illustrated in part (e) of FIG. 12. In this state, when the user presses the exit button 1005 on the color adjustment screen 1000, the display control unit 212 displays the top screen 2000 illustrated in part (a) of FIG. 12.

Next, a description is given of a screen transition in case of additional reading processing of a color chart with reference to FIG. 13.

The screen transitions to the read dialog box 1400 illustrated in part (b) of FIG. 13, the color adjustment screen 1000 illustrated in part (c) of FIG. 13, and the color adjustment screen 1000 illustrated in part (d) of FIG. 13 are the same as the screen transitions to the read dialog box 1400 illustrated in part (b) of FIG. 12, the color adjustment screen 1000 illustrated in part (d) of FIG. 12, and the color adjustment screen 1000 illustrated in part (e) of FIG. 12, respectively. When the color matching processing for the individual image forming apparatus 10 and for each sheet type advances and the color matching processing is complete for all the individual image forming apparatuses 10 and all the sheet types (normally or abnormally), the color adjustment screen 1000 transitions to a state illustrated in part (d) of FIG. 13 in which the read button 1004 is operable.

Here, in a case where the user desires the image reading device 30 to additionally execute the reading processing of the adjustment color chart CCA, CCB or the confirmation color chart, the user presses the read button 1004. Then, the display control unit 212 again displays the read dialog box 1400 illustrated in part (b) of FIG. 13. Here, in a case where the user presses the cancel button 1402, the color adjustment screen 1000 illustrated in part (b) of FIG. 13 returns to the color adjustment screen 1000 illustrated in part (d) of FIG. 13. In a case where the user presses the reading start button 1401 in a state where the color chart subjected to additional reading processing is set on the image reading device 30, the display control unit 212 displays the color adjustment screen 1000 illustrated in part (c) of FIG. 13 and the communication unit 201 transmits an instruction to start the reading processing to the image reading device 30. Accordingly, the color matching processing for the additional color chart is executed from step S13 illustrated in FIG. 11.

When the user presses the exit button 1005 on the color adjustment screen 1000 in the state illustrated in part (d) of FIG. 13, the display control unit 212 displays the top screen 2000 illustrated in part (a) of FIG. 13.

Color Matching Processing for Single Image Forming Apparatus

Figure 14:
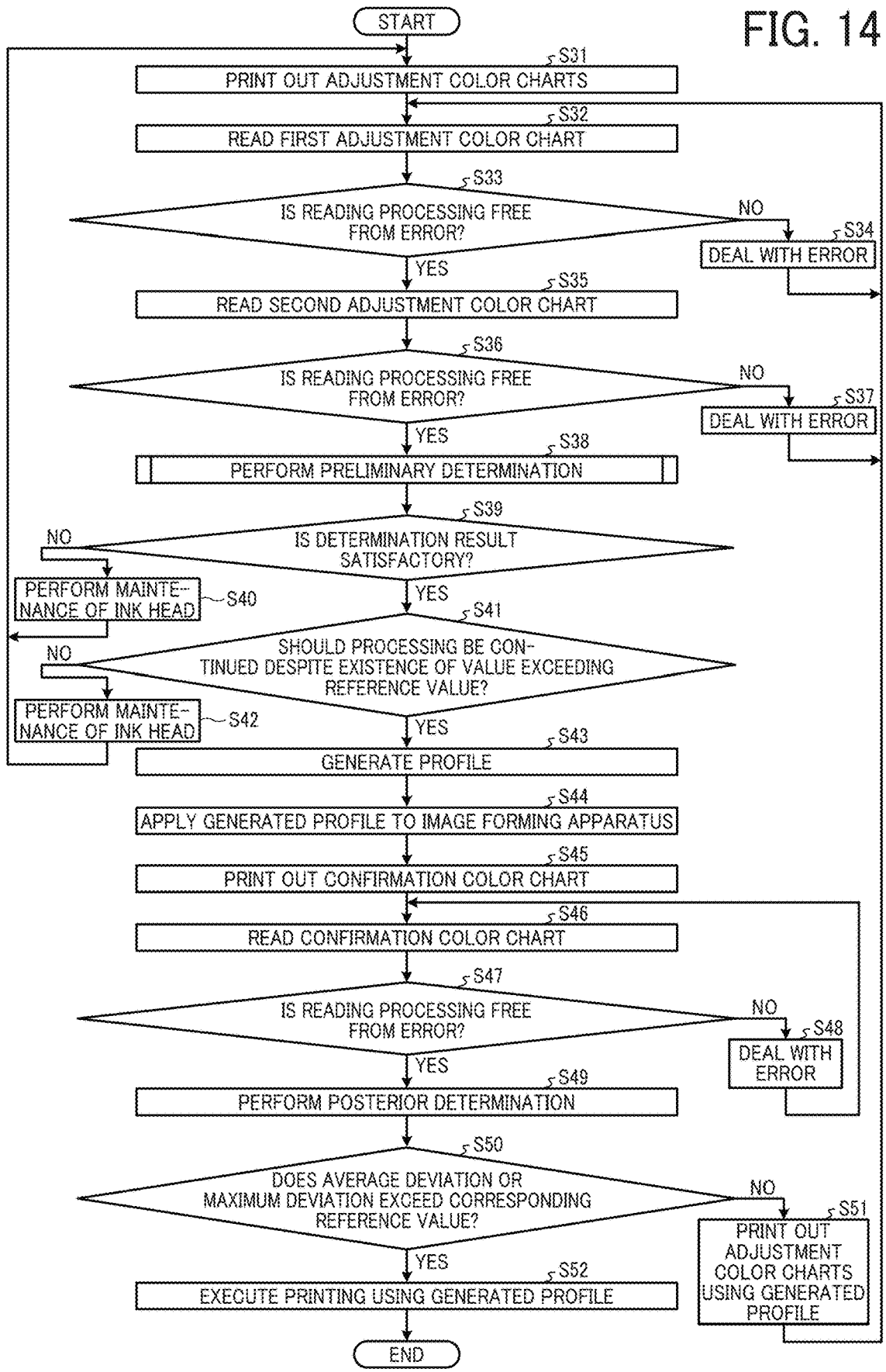
FIG. 14 is a flowchart illustrating an example of the color matching processing to be executed for a single image forming apparatus in the image forming system according to one embodiment of the present disclosure.
Figure 15:
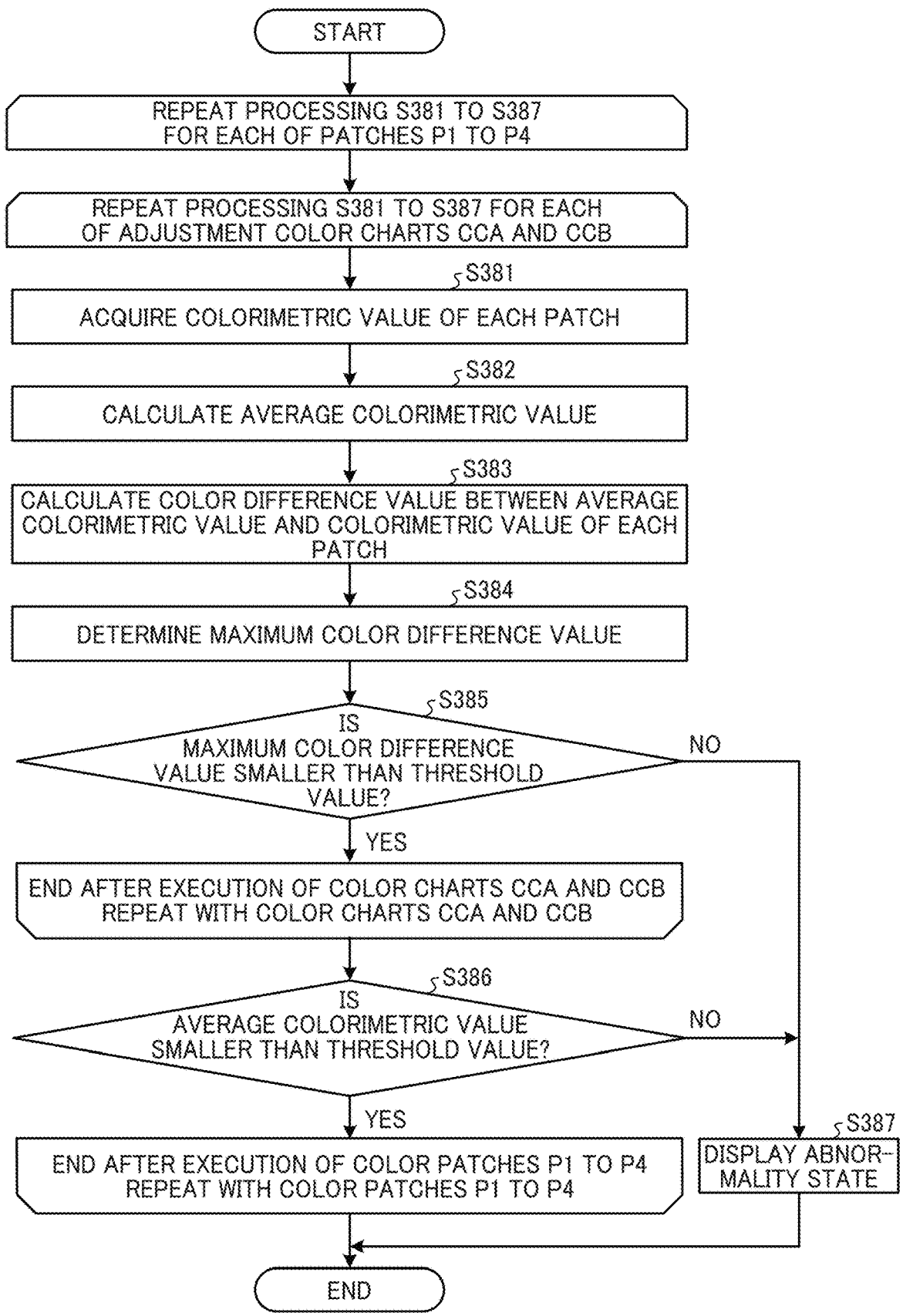
FIG. 15 is a flowchart illustrating an example of processing of preliminary determination to be executed by the image forming apparatus according to one embodiment of the present disclosure.

FIG. 14 is a flowchart illustrating an example of the color matching processing to be executed for a single image forming apparatus in the image forming system according to the present embodiment. FIG. 15 is a flowchart illustrating an example of processing of preliminary determination to be executed by the image forming apparatus according to the present embodiment. A description is given of the color matching processing to be executed for a single image forming apparatus 10 in the image forming system 1 according to the present embodiment with reference to FIGS. 14 and 15. In FIG. 14, the processing of posterior determination after execution of the color matching processing is also described.

Step S31

The user performs an operation for printing out the adjustment color charts CCA and CCB via the control panel 510 included in the image forming apparatus 10. Accordingly, the job acquisition unit 102 acquires a print job of color chart data of the adjustment color charts CCA and CCB from the chart transmission unit 202 included in the information processing apparatus 20. Then, the print control unit 103 causes the plotter 531 to print out the adjustment color charts CCA and CCB based on the print job of the color chart data acquired by the job acquisition unit 102. Then, the processing proceeds to step S32.

Step S32

In accordance with a user operation, the image reading device 30 executes the reading processing of the adjustment color chart CCA (a first adjustment color chart CC) and generates color information data by converting read values of the adjustment color chart CCA read by the image reading device 30 into colorimetric values. The image reading device 30 transmits the color information data of the adjustment color chart CCA generated by the image reading device 30 to the information processing apparatus 20. The communication unit 201 included in the information processing apparatus 20 receives the color information data.

The colorimetric value acquisition unit 203 included in the information processing apparatus 20 acquires the color information data of the adjustment color chart CCA received by the communication unit 201. The identification unit 204 included in the information processing apparatus 20 identifies color code information of the color code CA from the color information data of the adjustment color chart CCA acquired by the colorimetric value acquisition unit 203, digitizes (decodes) the color code information of the color code CA, and identifies the image forming apparatus 10 (device type, etc.), the sheet type, the adjustment color chart CCA being the first color chart, the patch array of the adjustment color chart CCA (the patch array of the color adjustment patch group CPA), and the date and time of the print output. Then, as illustrated in FIG. 9, the display control unit 212 included in the information processing apparatus 20 respectively displays the device name of the image forming apparatus 10 and the sheet type identified by the identification unit 204 in the device name cell 1111 and the sheet type cell 1112 of the color matching progress record 1110 which is blank on the color adjustment screen 1000. Then, the processing proceeds to step S33.

Step S33

When the reading processing executed by the image reading device 30 is determined to be free from an error such as occurrence of a jam or a mistake of reversely reading front and back sides (step S33: Yes), the processing proceeds to step S35. On the other hand, when the reading processing executed by the image reading device 30 is determined not to be free from such an error (step S33: No), the processing proceeds to step S34.

Step S34

The user deals with an error occurred in the reading processing executed by the image reading device 30. Then, the processing returns to step S32.

Step S35

In accordance with a user operation, the image reading device 30 executes the reading processing of the adjustment color chart CCB (a second adjustment color chart CC) and generates color information data by converting read values of the adjustment color chart CCB read by the image reading device 30 into colorimetric values. The image reading device 30 transmits the color information data of the adjustment color chart CCB generated by the image reading device 30 to the information processing apparatus 20. The communication unit 201 included in the information processing apparatus 20 receives the color information data.

The colorimetric value acquisition unit 203 acquires the color information data of the adjustment color chart CCB received by the communication unit 201. The identification unit 204 identifies color code information of the color code CB from the color information data of the adjustment color chart CCB acquired by the colorimetric value acquisition unit 203, digitizes (decodes) the color code information of the color code CB, and identifies the image forming apparatus 10 (device type, etc.), the sheet type, the adjustment color chart CCB being the second color chart, the patch array of the adjustment color chart CCB (the patch array of the color adjustment patch group CPB), and the date and time of the print output. Note that, when the adjustment color chart CCB that is the second adjustment color chart CC has been read, the display control unit 212 may respectively display the device name of the image forming apparatus 10 and the sheet type identified by the identification unit 204 in the device name cell 1111 and the sheet type cell 1112 of the color matching progress record 1110. Then, the processing proceeds to step S36.

Step S36

When the reading processing executed by the image reading device 30 is determined to be free from an error such as occurrence of a jam or a mistake of reversely reading front and back sides (step S36: Yes), the processing proceeds to step S38. On the other hand, when the reading processing executed by the image reading device 30 is determined not to be free from such an error (step S36: No), the processing proceeds to step S37.

Step S37

The user deals with an error occurred in the reading processing executed by the image reading device 30. Then, the processing returns to step S32.

Step S38

Next, the information processing apparatus 20 executes the processing of preliminary determination of steps S381 to S387 illustrated in FIG. 15 for the adjustment color charts CCA and CCB. A description is now given of the processing of preliminary determination with reference to FIG. 15.

Step S381

The patch acquisition unit 205 included in the information processing apparatus 20 identifies parts corresponding to the determination patches JPA1 to JPA9 embedded at the nine positions in the color adjustment patch group CPA from the color information data of the adjustment color chart CCA acquired by the colorimetric value acquisition unit 203, and acquires a colorimetric value (Lab value) of the patch P1 in each of the determination patches JPA1 to JPA9. Then, the processing proceeds to step S382.

Step S382

The calculation unit 206 included in the information processing apparatus 20 calculates an average colorimetric value of (L*A1_ave, a*A1_ave, b*A1_ave) which is an average value of the colorimetric values of each patch P1 of each of the determination patches JPA1 to JPA9 acquired by the patch acquisition unit 205 according to the above formula (1). Then, the processing proceeds to step S383.

Step S383

Next, the calculation unit 206 calculates respective color differences ΔEA1_1 to ΔEA1_9 between the values of (L*A1_1, a*A1_1, b*A1_1) to (L*A1_9, a*A1_9, b*A1_9) which are the colorimetric values (Lab values) of each patch P1 of each of the determination patches JPA1 to JPA9 of the adjustment color chart CCA and the calculated average colorimetric value of (L*A1_ave, a*A1_ave, b*A1_ave). Then, the processing proceeds to step S384.

Step S384

Then, the calculation unit 206 determines the maximum value ΔEA1_Max among the calculated color differences ΔEA1_1 to ΔEA1_9. Then, the processing proceeds to step S385.

Step S385

The first determination unit 207 included in the information processing apparatus 20 determines whether the maximum values ΔEA1_Max determined by the calculation unit 206 is equal to or greater than the predetermined threshold value "Thresh" according to the above formula (3). When the first determination unit 207 determines that the maximum value ΔEA1_Max is smaller than the predetermined threshold value "Thresh" (step S385: Yes), the processing returns to step S381 to repeat the processing in steps S381 to S385 for the patch P1 of the adjustment color chart CCB. In a case where the processing in steps S381 to S385 for the patch P1 of the adjustment color chart CCB is completed, the processing proceeds to step S386. On the other hand, when the first determination unit 207 determines that the maximum value ΔEA1_Max is equal to or greater than the predetermined threshold value "Thresh" (step S385: No), the processing proceeds to step S387.

Step S386

Further, the first determination unit 207 determines whether the difference ΔE1_AB calculated by the calculation unit 206 is equal to or greater than the predetermined threshold value "Thresh2" according to the above formula (4). It is assumed that the first determination unit 207 determines that the difference ΔE1_AB is smaller than the predetermined threshold value "Thresh2" (step S386: Yes). In a case where the processing in steps S381 to S387 is not completed for all of the patches P2 to P4 of the adjustment color chart CCA and CCB, the processing returns to step S381 to repeat the processing in steps S381 to S387 for all of the patches P2 to P4 of the adjustment color chart CCA and CCB to be completed. In a case where the processing in steps S381 to S387 is completed for all of the patches P2 to P4 of the adjustment color chart CCA and CCB, the processing of preliminary determination ends, and the processing proceeds to step S39 illustrated in FIG. 14. In the case where the processing in steps S381 to S387 is completed for all of the patches P1 to P4 of the adjustment color chart CCA and CCB, the first determination unit 207 determines that the determination results for the adjustment color charts CCA and CCB are normal. Then, the display control unit 212 displays the in-sheet deviations and the inter-sheet deviation which are the determination results for the adjustment color charts CCA and CCB, a device value (CMYK value) at the time of determination, the time at the time of determination, and the normal completion mark 1121 representing a normal state in the preliminary determination cell 1113 of a corresponding color matching progress record 1110, and displays the entire preliminary determination cell 1113, for example, in green. On the other hand, when the first determination unit 207 determines that the difference ΔE1_AB is equal to or greater than the predetermined threshold value "Thresh2" (step S386: No), the processing proceeds to step S387.

Step S387

When the first determination unit 207 determines that the maximum value ΔEA1_Max is equal to or greater than the predetermined threshold value "Thresh" or determines that the difference ΔE1_AB is equal to or greater than the threshold value "Thresh2," the first determination unit 207 determines that there is unevenness in one sheet of the color adjustment patch group CPA included in the adjustment color chart CCA, the color adjustment patch group CPB included in the adjustment color chart CCB, or both, and determines that the image forming apparatus 10 identified by the identification unit 204 is in an abnormal state. Assuming that the first determination unit 207 determines that the determination results for the adjustment color charts CCA and CCB are cautious or abnormal, the display control unit 212 displays the in-sheet deviations and the inter-sheet deviation which are the determination results for the adjustment color charts CCA and CCB, a device value (CMYK value) at the time of determination, and the time at the time of determination in the preliminary determination cell 1113 of a corresponding color matching progress record 1110 on the color adjustment screen 1000 as illustrated in FIG. 9. In a case where the first determination unit 207 determines that the determination results for the adjustment color charts CCA and CCB are cautious, the display control unit 212 displays the warning mark 1122 representing the cautious state together with the determination results and a number that indicates the type of the warning in the preliminary determination cell 1113 of a corresponding color matching progress record 1110. In a case where the first determination unit 207 determines that the determination results for the adjustment color charts CCA and CCB are abnormal, the display control unit 212 displays the abnormality mark 1123 representing the abnormal state together with the determination results and a number that indicates the type of the abnormality in the preliminary determination cell 1113 of a corresponding color matching progress record 1110, and displays the entire preliminary determination cell 1113, for example, in red. Then, the processing of preliminary determination ends, and the processing proceeds to step S39.

Step S39

In a case where the first determination unit 207 determines that any of the in-sheet deviations is equal to or greater than the predetermined threshold value "Thresh" or determines that the inter-sheet deviation is equal to or greater than the predetermined threshold value "Thresh2", the first determination unit 207 determines that the determination results for the adjustment color charts CCA and CCB are abnormal (step S39: No). Then, the processing proceeds to step S40. On the other hand, in the case where the first determination unit 207 determines that all of the in-sheet deviations are smaller than the predetermined threshold value "Thresh" and determines that the inter-sheet deviation is smaller than the predetermined threshold value "Thresh2", the first determination unit 207 determines that the determination results for the adjustment color charts CCA and CCB are not abnormal (step S39: Yes). Then, the processing proceeds to step S41.

Step S40

The user performs maintenance of an ink head or the like of the target image forming apparatus 10. Then, the processing returns to step S31.

Step S41

The first determination unit 207 determines whether set values determined in advance (e.g., in-sheet deviation, inter-sheet deviation, device value, etc.) exceed (deviate from) respective reference values. In a case where the first determination unit 207 determines that all of the set values are smaller than the respective reference values (in a case where the result of the final determination is normal), or determines that some of the set values exceed the respective reference values (an example of a case where the results are not normal but satisfy a predetermined condition) (in a case where the result of the final determination is cautious), the first determination unit 207 determines that the color matching processing can be continued without suspension (step S41: Yes). Then, the processing proceeds to step S43. On the other hand, in a case where the first determination unit 207 determines that all of the set values exceed the respective reference values (in a case where the result of the final determination is abnormal), the first determination unit 207 determines that the color matching processing cannot be continued (step S41: No). Then, the processing proceeds to step S42. The determination method is not limited to the above example, and for example, the determination may be performed using a plurality of reference values for one set value.

Step S42

The user performs maintenance of an ink head or the like of the target image forming apparatus 10. Then, the processing returns to step S31.

Step S43

The profile generation unit 208 included in the information processing apparatus 20 generates a profile by using the colorimetric value of each patch corresponding to the color adjustment patch groups CPA and CPB in the color information data of the adjustment color charts CCA and CCB. Then, as illustrated in FIG. 9, the display control unit 212 displays an indication indicating that the profile is successfully generated by the profile generation unit 208 in the profile generation cell 1114 of a corresponding color matching progress record 1110 on the color adjustment screen 1000. Then, the processing proceeds to step S44.

Step S44

The profile transmission unit 209 included in the information processing apparatus 20 transmits the profile generated by the profile generation unit 208 to the image forming apparatus 10 identified by the identification unit 204 via the communication unit 201. The profile acquisition unit 104 included in the image forming apparatus 10 acquires the profile received by the communication unit 101 from the information processing apparatus 20. The profile acquisition unit 104 stores (registers) the acquired profile for the image forming apparatus 10 and for each sheet type in the storage unit 105. Then, the profile acquisition unit 104 transmits, to the information processing apparatus 20 via the communication unit 101, a notification indicating that the profile is successfully registered. In response to receiving the notification indicating that the profile is successfully registered in the target image forming apparatus 10 via the communication unit 201, the display control unit 212 displays an indication indicating that the profile is successfully registered in the profile registration cell 1115 of a corresponding color matching progress record 1110 on the color adjustment screen 1000 as illustrated in FIG. 9. Then, the processing proceeds to step S45.

Step S45

The user performs an operation for printing out the confirmation color chart via the control panel 510 included in the image forming apparatus 10. Accordingly, the job acquisition unit 102 acquires a print job of color chart data of the confirmation color chart from the chart transmission unit 202 included the information processing apparatus 20. Then, the print control unit 103 causes the plotter 531 to print out the confirmation color chart by applying the profile registered in step S44 based on the print job of the color chart data acquired by the job acquisition unit 102. Then, the processing proceeds to step S46.

Step S46

In accordance with a user operation, the image reading device 30 executes the reading processing of the confirmation color chart and generates color information data by converting read values of the confirmation color chart read by the image reading device 30 into colorimetric values. The image reading device 30 transmits the color information data of the confirmation color chart generated by the image reading device 30 to the information processing apparatus 20. The communication unit 201 included in the information processing apparatus 20 receives the color information data.

The colorimetric value acquisition unit 203 acquires the color information data of the confirmation color chart received by the communication unit 201. The identification unit 204 identifies color code information of the color code from the color information data of the confirmation color chart acquired by the colorimetric value acquisition unit 203, digitizes (decodes) the color code information of the color code, and identifies the image forming apparatus 10 (device type, etc.), the sheet type, the patch array of the confirmation color chart, and the date and time of the print output. Then, the processing proceeds to step S47.

Step S47

When the reading processing executed by the image reading device 30 is determined to be free from an error such as occurrence of a jam or a mistake of reversely reading front and back sides (step S47: Yes), the processing proceeds to step S49. On the other hand, when the reading processing executed by the image reading device 30 is determined not to be free from such an error (step S47: No), the processing proceeds to step S48.

Step S48

The user deals with an error occurred in the reading processing executed by the image reading device 30. Then, the processing returns to step S46.

Step S49

The patch acquisition unit 205 acquires a colorimetric value (Lab value) of each patch forming the confirmation color chart from the color information data acquired by the colorimetric value acquisition unit 203. Next, the second determination unit 210 performs posterior determination regarding the average deviation and the maximum deviation in comparison with a print standard such as "Japan Color," "G7," or "Fogra" using the colorimetric value of each patch forming the confirmation color chart acquired by the patch acquisition unit 205. Then, the display control unit 212 displays the determination result of the posterior determination for the confirmation color chart performed by the second determination unit 210 in a corresponding posterior determination record 1310 as illustrated in FIG. 9. Then, the processing proceeds to step S50.

Step S50

In a case where the second determination unit 210 determines that the average deviation or the maximum deviation exceeds (deviates from) the corresponding reference value (in a case where the determination result of the posterior determination is abnormal) (step S50: No), the processing proceeds to step S51. In a case where the second determination unit 210 determines that neither the average deviation nor the maximum deviation exceeds the corresponding reference value (in a case where the determination result of the posterior determination is normal) (step S50: Yes), the processing proceeds to step S52.

Step S51

The user again performs an operation for printing out the adjustment color charts CCA and CCB via the control panel 510 included the image forming apparatus 10. Accordingly, the job acquisition unit 102 acquires a print job of color chart data of the adjustment color charts CCA and CCB from the chart transmission unit 202 included in the information processing apparatus 20. Then, the print control unit 103 causes the plotter 531 to print out the adjustment color charts CCA and CCB by applying the profile registered in step S44 based on the print job of the color chart data acquired by the job acquisition unit 102. Then, the processing returns to step S32. In other words, since the determination result of the posterior determination is abnormal for the confirmation color chart, the color matching processing is executed again by using the adjustment color charts CCA and CCB printed out by applying the latest profile.

Step S52

In a case where the second determination unit 210 determines that the determination result of the posterior determination is normal, the profile generated and registered in steps S43 and S44 respectively is applied to control of printing to be executed by the target image forming apparatus 10 on the target sheet type.

Color Matching Processing for Plurality of Image Forming Apparatuses

Figure 16:
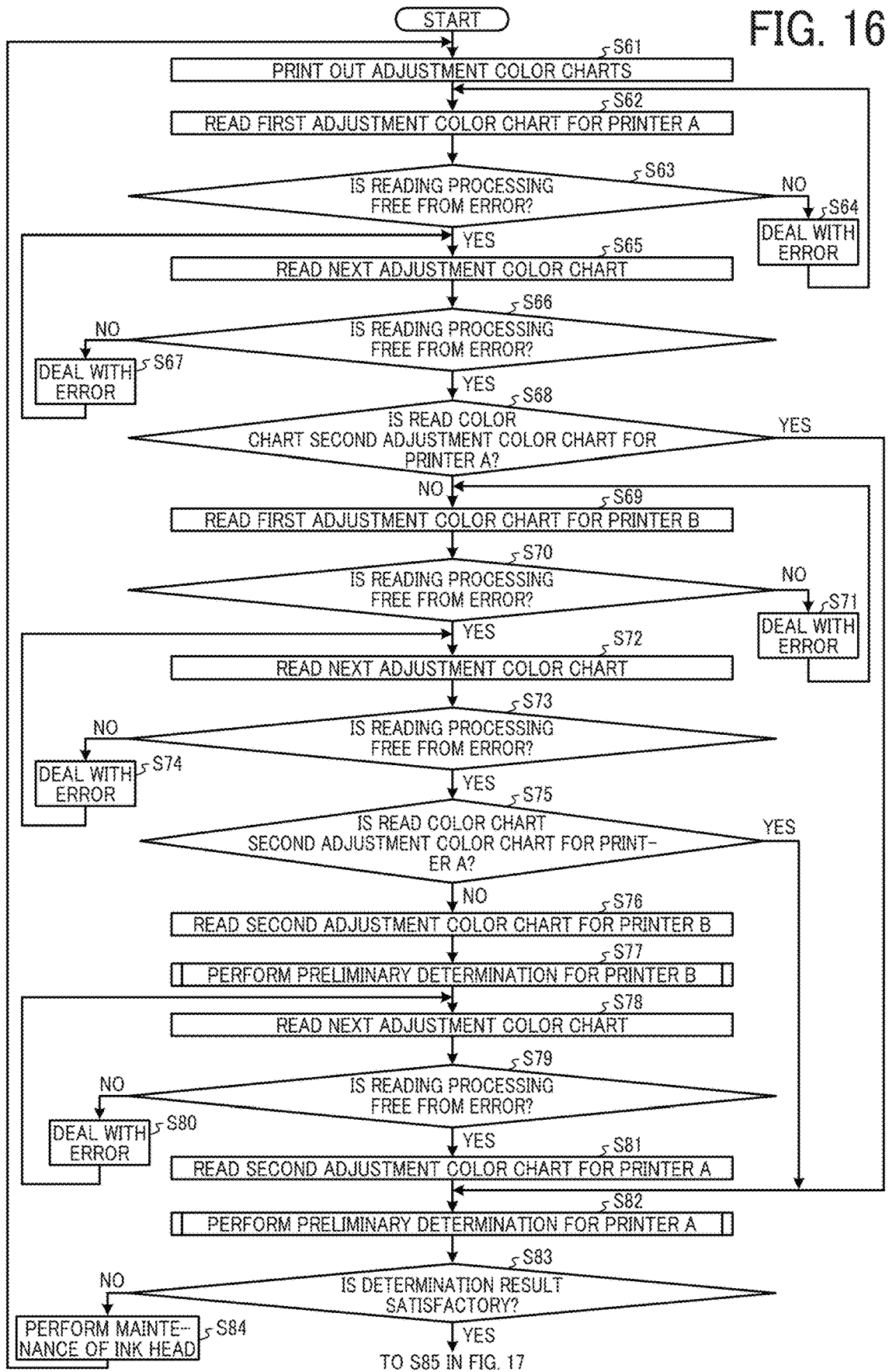
FIG. 16 is a flowchart illustrating an example of the color matching processing to be executed for a plurality of image forming apparatuses in the image forming system according to one embodiment of the present disclosure.
Figure 17:
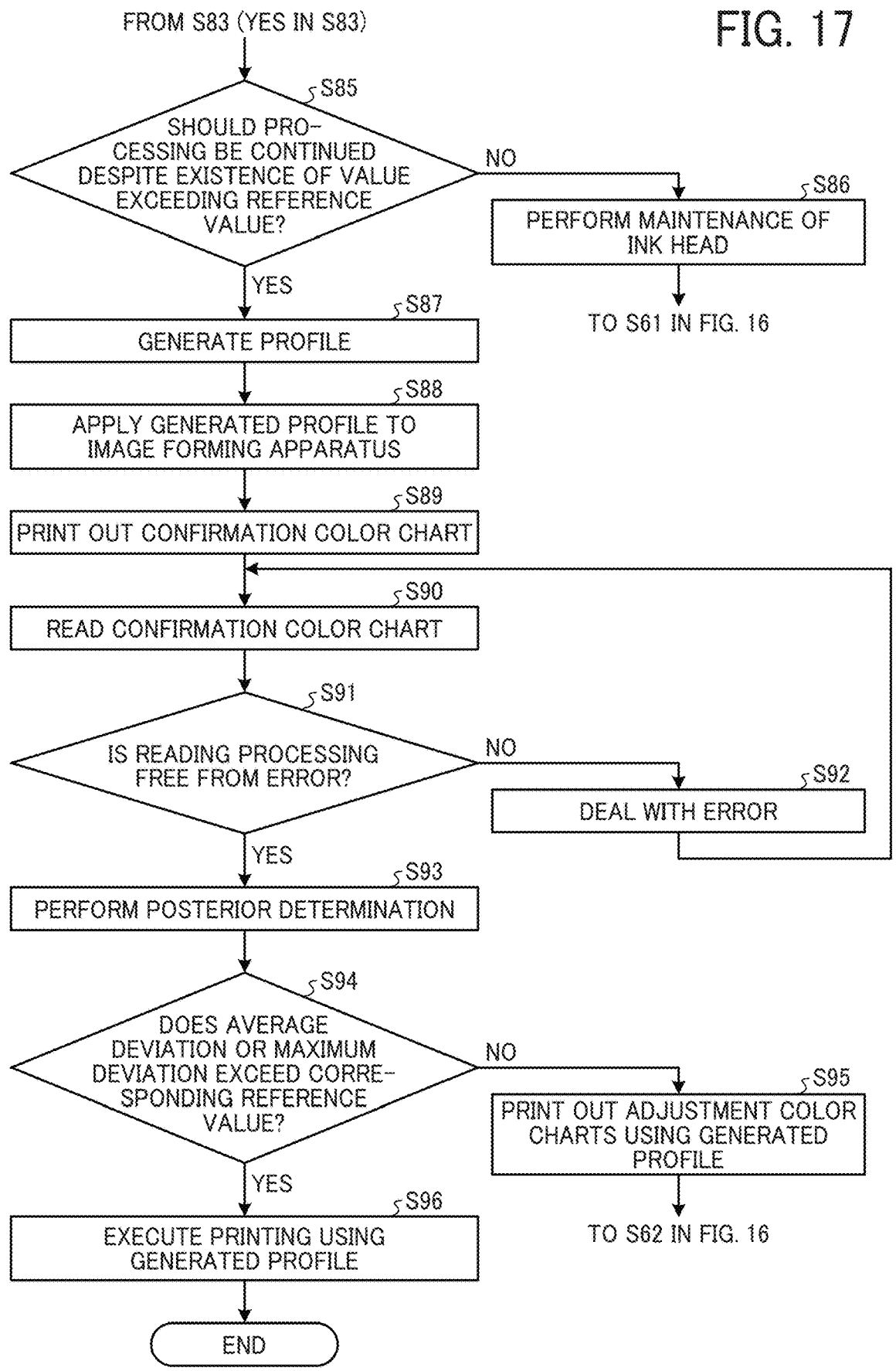
FIG. 17 is a flowchart illustrating an example of the color matching processing to be executed for the plurality of image forming apparatuses in the image forming system according to one embodiment of the present disclosure.

FIGS. 16 and 17 are flowcharts illustrating an example of the color matching processing to be executed for a plurality of image forming apparatuses in the image forming system according to the present embodiment. A description is given of the color matching processing to be executed for a plurality of image forming apparatuses 10 in the image forming system 1 according to the present embodiment with reference to FIGS. 16 and 17. In FIGS. 16 and 17, the processing of posterior determination after execution of the color matching processing is also described. In FIGS. 16 and 17, assuming that color matching processing is executed for two image forming apparatuses 10, the two image forming apparatuses 10 are referred to as a "printer A" and a "printer B," respectively Step S61

The user performs an operation for printing out the adjustment color charts CCA and CCB via the control panel 510 included in each of the printers A and B. Accordingly, the job acquisition unit 102 included in each of the printers A and B acquires a print job of color chart data of the adjustment color charts CCA and CCB from the chart transmission unit 202 included in the information processing apparatus 20. Then, the print control unit 103 included in each of the printers A and B causes a corresponding plotter 531 to print out the adjustment color charts CCA and CCB based on the print job of the color chart data acquired by the respective job acquisition units 102. Then, the processing proceeds to step S62.

Step S62

In accordance with a user operation, the image reading device 30 collectively executes reading processing of a plurality of adjustment color charts CC set on the image reading device 30. First, in accordance with a user operation, when the image reading device 30 executes the reading processing of the adjustment color chart CCA (the first adjustment color chart CC) printed out by the printer A, the image reading device 30 generates color information data by converting read values of the adjustment color chart CCA read by the image reading device 30 into colorimetric values. The image reading device 30 transmits the color information data generated by the image reading device 30 reading the adjustment color chart CCA printed out by the printer A to the information processing apparatus 20. The communication unit 201 included in the information processing apparatus 20 receives the color information data.

The colorimetric value acquisition unit 203 included in the information processing apparatus 20 acquires the color information data of the adjustment color chart CCA printed out by the printer A received by the communication unit 201. The identification unit 204 included in the information processing apparatus 20 identifies color code information of the color code CA from the color information data of the adjustment color chart CCA printed out by the printer A acquired by the colorimetric value acquisition unit 203, digitizes (decodes) the color code information of the color code CA, and identifies the device name of the printer A, the sheet type, the adjustment color chart CCA being the first color chart, the patch array of the adjustment color chart CCA (the patch array of the color adjustment patch group CPA), and the date and time of the print output. Then, the display control unit 212 included in the information processing apparatus 20 respectively displays the device name of the printer A and the sheet type identified by the identification unit 204 in the device name cell 1111 and the sheet type cell 1112 of the color matching progress record 1110 which is blank on the color adjustment screen 1000 as illustrated in FIG. 9. Then, the processing proceeds to step S63.

Step S63

When the reading processing executed by the image reading device 30 is determined to be free from an error such as occurrence of a jam or a mistake of reversely reading front and back sides (step S63: Yes), the processing proceeds to step S65. On the other hand, when the reading processing executed by the image reading device 30 is determined not to be free from such an error (step S63: No), the processing proceeds to step S64.

Step S64

The user deals with an error occurred in the reading processing executed by the image reading device 30. Then, the processing returns to step S62.

Step S65

Subsequently, in accordance with a user operation, the image reading device 30 executes the reading processing of the next adjustment color chart CC and generates color information data by converting read values of the next adjustment color chart CC read by the image reading device 30 into colorimetric values. The image reading device 30 transmits the color information data of the next adjustment color chart CC generated by the image reading device 30 to the information processing apparatus 20. The communication unit 201 included in the information processing apparatus 20 receives the color information data.

The colorimetric value acquisition unit 203 acquires the color information data of the next adjustment color chart CC received by the communication unit 201. The identification unit 204 identifies color code information of the color code C from the color information data of the next adjustment color chart CC acquired by the colorimetric value acquisition unit 203, digitizes (decodes) the color code information of the color code C, and identifies the device name of the image forming apparatus 10, the sheet type, the page information indicating the sheet number, the patch array (the patch array of the color adjustment patch group CP), and the date and time of the print output corresponding to the next adjustment color chart CC. Then, as illustrated in FIG. 9, in a case where no corresponding color matching progress record 1110 exists on the color adjustment screen 1000 yet, the display control unit 212 respectively displays the device name of the image forming apparatus 10 and the sheet type identified by the identification unit 204 in the device name cell 1111 and the sheet type cell 1112 of the color matching progress record 1110 which is blank. Then, the processing proceeds to step S66.

Step S66

When the reading processing executed by the image reading device 30 is determined to be free from an error such as occurrence of a jam or a mistake of reversely reading front and back sides (step S66: Yes), the processing proceeds to step S68. On the other hand, when the reading processing executed by the image reading device 30 is determined not to be free from such an error (step S66: No), the processing proceeds to step S67.

Step S67

The user deals with an error occurred in the reading processing executed by the image reading device 30. Then, the processing returns to step S65.

Step S68

In a case where the identification unit 204 identifies that the next adjustment color chart CC is the adjustment color chart CCB printed out by the printer A (the second adjustment color chart CC) from the color information data of the next color chart CC in step S65 (step S68: Yes), the processing proceeds to step S82. On the other hand, in a case where the identification unit 204 identifies that the next adjustment color chart CC is not the adjustment color chart CCB printed out by the printer A (the second adjustment color chart CC) from the color information data of the next color chart CC in step S65 (step S68: No), the processing proceeds to step S69.

Step S69

Subsequently, in accordance with a user operation, when the image reading device 30 executes the reading processing of the adjustment color chart CCA (the first adjustment color chart CC) printed out by the printer B, the image reading device 30 generates color information data by converting read values of the adjustment color chart CCA read by the image reading device 30 into colorimetric values. The image reading device 30 transmits the color information data generated by the image reading device 30 reading the adjustment color chart CCA printed out by the printer B to the information processing apparatus 20. The communication unit 201 included in the information processing apparatus 20 receives the color information data.

The colorimetric value acquisition unit 203 acquires the color information data of the adjustment color chart CCA printed out by the printer B received by the communication unit 201. The identification unit 204 identifies color code information of the color code CA from the color information data of the adjustment color chart CCA printed out by the printer B acquired by the colorimetric value acquisition unit 203, digitizes (decodes) the color code information of the color code CA, and identifies the device name of the printer B, the sheet type, the adjustment color chart CCA being the first color chart, the patch array of the adjustment color chart CCA (the patch array of the color adjustment patch group CPA), and the date and time of the print output. Then, the display control unit 212 respectively displays the device name of the printer B and the sheet type identified by the identification unit 204 in the device name cell 1111 and the sheet type cell 1112 of the color matching progress record 1110 which is blank on the color adjustment screen 1000 as illustrated in FIG. 9. Thus, for example, in a state where a plurality of color charts printed out by the printer A and a plurality of color charts printed out by the printer B are mixed one by one alternately, even if the plurality of color charts printed out by the printer A and the plurality of color charts printed out by the printer B are collectively read by the image reading device 30, the color matching processing can be continued without being stopped or causing an error. In addition, the user can easily check for which printer and sheet type the pending processing after reading the first color chart is to be executed. Then, the processing proceeds to step S70.

Step S70

When the reading processing executed by the image reading device 30 is determined to be free from an error such as occurrence of a jam or a mistake of reversely reading front and back sides (step S70: Yes), the processing proceeds to step S72. On the other hand, when the reading processing executed by the image reading device 30 is determined not to be free from such an error (step S70: No), the processing proceeds to step S71.

Step S71

The user deals with an error occurred in the reading processing executed by the image reading device 30. Then, the processing returns to step S69.

Step S72

Subsequently, in accordance with a user operation, the image reading device 30 executes the reading processing of the next adjustment color chart CC and generates color information data by converting read values of the next adjustment color chart CC read by the image reading device 30 into colorimetric values. The image reading device 30 transmits the color information data of the next adjustment color chart CC generated by the image reading device 30 to the information processing apparatus 20. The communication unit 201 included in the information processing apparatus 20 receives the color information data.

The colorimetric value acquisition unit 203 acquires the color information data of the next adjustment color chart CC received by the communication unit 201. The identification unit 204 identifies color code information of the color code C from the color information data of the next adjustment color chart CC acquired by the colorimetric value acquisition unit 203, digitizes (decodes) the color code information of the color code C, and identifies the device name of the image forming apparatus 10, the sheet type, the page information indicating the sheet number, the patch array (the patch array of the color adjustment patch group CP), and the date and time of the print output corresponding to the next adjustment color chart CC. Then, as illustrated in FIG. 9, in a case where no corresponding color matching progress record 1110 exists on the color adjustment screen 1000 yet, the display control unit 212 respectively displays the device name of the image forming apparatus 10 and the sheet type identified by the identification unit 204 in the device name cell 1111 and the sheet type cell 1112 of the color matching progress record 1110 which is blank. Then, the processing proceeds to step S73.

Step S73

When the reading processing executed by the image reading device 30 is determined to be free from an error such as occurrence of a jam or a mistake of reversely reading front and back sides (step S73: Yes), the processing proceeds to step S75. On the other hand, when the reading processing executed by the image reading device 30 is determined not to be free from such an error (step S73: No), the processing proceeds to step S74.

Step S74

The user deals with an error occurred in the reading processing executed by the image reading device 30. Then, the processing returns to step S72.

Step S75

In a case where the identification unit 204 identifies that the next adjustment color chart CC is the adjustment color chart CCB printed out by the printer A (the second adjustment color chart CC) from the color information data of the next color chart CC in step S72 (step S75: Yes), the processing proceeds to step S82. On the other hand, in a case where the identification unit 204 identifies that the next adjustment color chart CC is not the adjustment color chart CCB printed out by the printer A (the second adjustment color chart CC) from the color information data of the next color chart CC in step S72 (step S75: No), the processing proceeds to step S76.

Step S76

Subsequently, in accordance with a user operation, when the image reading device 30 executes the reading processing of the adjustment color chart CCB (the second adjustment color chart CC) printed out by the printer B, the image reading device 30 generates color information data by converting read values of the adjustment color chart CCB read by the image reading device 30 into colorimetric values. The image reading device 30 transmits the color information data of the adjustment color chart CCB generated by the image reading device 30 to the information processing apparatus 20. The communication unit 201 included in the information processing apparatus 20 receives the color information data.

The colorimetric value acquisition unit 203 acquires the color information data of the adjustment color chart CCB printed out by the printer B received by the communication unit 201. The identification unit 204 identifies color code information of the color code CB from the color information data of the adjustment color chart CCB printed out by the printer B acquired by the colorimetric value acquisition unit 203, digitizes (decodes) the color code information of the color code CB, and identifies the device name of the printer B, the sheet type, the adjustment color chart CCB being the second color chart, the patch array of the adjustment color chart CCB (the patch array of the color adjustment patch group CPB), and the date and time of the print output. Note that the device name of the printer B and the sheet type identified by the identification unit 204 are already displayed respectively in the device name cell 1111 and the sheet type cell 1112 of the color matching progress record 1110 on the color adjustment screen 1000 in step S69. Then, the processing proceeds to step S77.

Step S77

At this time, since the reading processing of the adjustment color charts CCA and CCB printed out by the printer B has been executed by the image reading device 30, the information processing apparatus 20 executes the processing of preliminary determination of steps S381 to S387 illustrated in FIG. 15 for the adjustment color charts CCA and CCB printed out by the printer B. Then, the processing proceeds to step S78.

Step S78

Subsequently, in accordance with a user operation, the image reading device 30 executes the reading processing of the next adjustment color chart CC and generates color information data by converting read values of the next adjustment color chart CC read by the image reading device 30 into colorimetric values. The image reading device 30 transmits the color information data of the next adjustment color chart CC generated by the image reading device 30 to the information processing apparatus 20. The communication unit 201 included in the information processing apparatus 20 receives the color information data.

The colorimetric value acquisition unit 203 acquires the color information data of the next adjustment color chart CC received by the communication unit 201. The identification unit 204 identifies color code information of the color code C from the color information data of the next adjustment color chart CC acquired by the colorimetric value acquisition unit 203, digitizes (decodes) the color code information of the color code C, and identifies the device name of the image forming apparatus 10, the sheet type, the page information indicating the sheet number, the patch array (the patch array of the color adjustment patch group CP), and the date and time of the print output corresponding to the next adjustment color chart CC. Then, as illustrated in FIG. 9, in a case where no corresponding color matching progress record 1110 exists on the color adjustment screen 1000 yet, the display control unit 212 respectively displays the device name of the image forming apparatus 10 and the sheet type identified by the identification unit 204 in the device name cell 1111 and the sheet type cell 1112 of the color matching progress record 1110 which is blank. Then, the processing proceeds to step S79.

Step S79

When the reading processing executed by the image reading device 30 is determined to be free from an error such as occurrence of a jam or a mistake of reversely reading front and back sides (step S79: Yes), the processing proceeds to step S81. On the other hand, when the reading processing executed by the image reading device 30 is determined not to be free from such an error (step S79: No), the processing proceeds to step S80.

Step S80

The user deals with an error occurred in the reading processing executed by the image reading device 30. Then, the processing returns to step S78.

Step S81

At this time, the reading processing of the adjustment color charts CCA and CCB printed out by the printer A has already been executed by the image reading device 30. Then, the processing proceeds to step S82.

Step S82

The information processing apparatus 20 executes the processing of preliminary determination of steps S381 to S387 illustrated in FIG. 15 for the adjustment color charts CCA and CCB. Then, the processing proceeds to step S83.

At the time when the reading processing of the two adjustment color charts CCA and CCB has been executed, the processing of preliminary determination can be performed for the adjustment color charts CCA and CCB, and it is not necessary to wait until the reading processing of the other two adjustment color charts CCA and CCB is completed.

Step S83

The processing of the subsequent steps S83 to S96 is executed for the printer A at the time when the processing of preliminary determination for the adjustment color charts CCA and CCB printed out by the printer A is completed. Further, the processing of the subsequent steps S83 to S96 is executed for the printer B at the time when the processing of preliminary determination for the adjustment color charts CCA and CCB printed out by the printer B is completed. The following description focuses on the processing for the printer A, but the processing for the printer B is executed in the same manner In a case where the first determination unit 207 determines that any of the in-sheet deviations is equal to or greater than the threshold value "Thresh" or determines that the inter-sheet deviation is equal to or greater than the threshold value "Thresh2", the first determination unit 207 determines that the determination results for the adjustment color charts CCA and CCB printed out by the printer A are abnormal (step S83: No). Then, the processing proceeds to step S84. On the other hand, in a case where the first determination unit 207 determines that all of the in-sheet deviations are smaller than the predetermined threshold value "Thresh" and determines that the inter-sheet deviation is smaller than the predetermined threshold value "Thresh2", the first determination unit 207 determines that the determination results for the adjustment color charts CCA and CCB printed out by the printer A are not abnormal (step S83: Yes). Then, the processing proceeds to step S85.

Step S84

The user performs maintenance of an ink head or the like of the target image forming apparatus 10. Then, the processing returns to step S61.

Step S85

The first determination unit 207 determines whether set values determined in advance (e.g., in-sheet deviation, inter-sheet deviation, device value, etc.) exceed (deviate from) respective reference values for the adjustment color charts CCA and CCB printed out by the printer A. In a case where the first determination unit 207 determines that all of the set values are smaller than the respective reference values (in a case where the result of the final determination is normal), or determines that some of the set values exceed the respective reference values (an example of a case where the results are not normal but satisfy a predetermined condition) (in a case where the result of the final determination is cautious), the first determination unit 207 determines that the color matching processing can be continued without suspension (step S85: Yes). Then, the processing proceeds to step S87. On the other hand, in a case where the first determination unit 207 determines that all of the set values exceed the respective reference values (in a case where the result of the final determination is abnormal), the first determination unit 207 determines that the color matching processing cannot be continued (step S85: No). Then, the processing proceeds to step S86. The determination method is not limited to the above example, and for example, the determination may be performed using a plurality of reference values for one set value.

Step S86

The user performs maintenance of an ink head or the like of the target image forming apparatus 10. Then, the processing returns to step S61.

Step S87

The profile generation unit 208 included in the information processing apparatus 20 generates a profile by using the colorimetric value of each patch corresponding to the color adjustment patch groups CPA and CPB in the color information data of the adjustment color charts CCA and CCB printed out by the printer A. Then, as illustrated in FIG. 9, the display control unit 212 displays an indication indicating that the profile is successfully generated by the profile generation unit 208 in the profile generation cell 1114 of a corresponding color matching progress record 1110 on the color adjustment screen 1000. Then, the processing proceeds to step S88.

Step S88

The profile transmission unit 209 included in the information processing apparatus 20 transmits the profile generated by the profile generation unit 208 to the printer A identified by the identification unit 204 via the communication unit 201. The profile acquisition unit 104 included in the printer A acquires the profile received by the communication unit 101 from the information processing apparatus 20. The profile acquisition unit 104 stores (registers) the generated profile for the printer A and for each sheet type in the storage unit 105. Then, the profile acquisition unit 104 transmits, to the information processing apparatus 20 via the communication unit 101, a notification indicating that the profile is successfully registered. In response to receiving the notification indicating that the profile is successfully registered in the printer A via the communication unit 201, the display control unit 212 displays an indication indicating that the profile is successfully registered in the profile registration cell 1115 of a corresponding color matching progress record 1110 on the color adjustment screen 1000 as illustrated in FIG. 9. Then, the processing proceeds to step S89.

Steps S89 to S96

The processing in steps S89 to S96 is the same as the processing in steps S45 to S52 in FIG. 14 described above.

As described above, in a case where the adjustment color charts CCA and CCB printed out by the printer A and the adjustment color charts CCA and CCB printed out by the printer B are set on the image reading device 30 in random order, the device name of the image forming apparatus 10, the sheet type, and the page information indicating the sheet number of the adjustment color chart CC are identified with the color code information of the color code C of each adjustment color chart CC. Thus, each stage of the processing such as preliminary determination to be performed by the first determination unit 207, profile generation to be performed by the profile generation unit 208, and profile registration to be performed in the image forming apparatus 10 is sequentially executed for the individual image forming apparatus 10 and for each sheet type without suspension. Although the operation of the color matching processing executed for the two image forming apparatuses 10, namely, the printers A and B, is described in FIGS. 16 and 17, the color matching processing for different sheet types can be simultaneously executed for a single image forming apparatus 10, or the color matching processing for three or more image forming apparatuses 10 can be simultaneously executed. Further, the color chart is identified whether to be an adjustment color chart CC or a confirmation color chart with the color code information of the color code C included in the color chart. Thus, in a case where the adjustment color chart CC and the confirmation color chart are set on the image reading device 30 in random order, the color matching processing using the color chart C and the processing of posterior determination using the confirmation color chart can be independently and simultaneously executed.

Screen Transition when Color Matching Processing is Suspended

Figure 18:
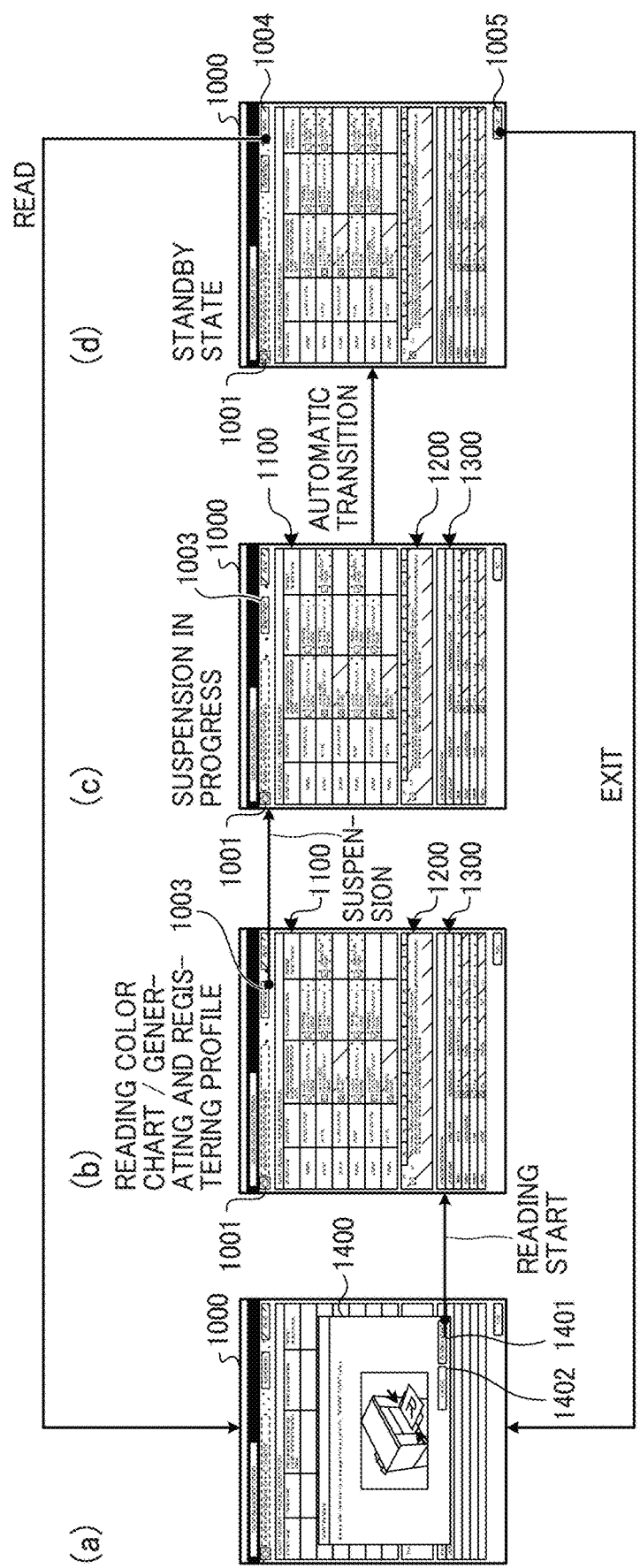
FIG. 18 is a diagram illustrating an example of a screen transition when the color matching processing is suspended in the information processing apparatus according to one embodiment of the present disclosure.

FIG. 18 is a diagram illustrating an example of a screen transition when the color matching processing is suspended in the information processing apparatus according to present embodiment. A description is given of the screen transition when the color matching processing is suspended in the information processing apparatus 20 with reference to FIG. 18.

The screen transitions to the read dialog box 1400 illustrated in part (a) of FIG. 18 and the color adjustment screen 1000 illustrated in part (b) of FIG. 18 are the same as the screen transitions to the read dialog box 1400 illustrated in part (b) of FIG. 13 and the color adjustment screen 1000 illustrated part (c) of FIG. 13 respectively.

When the user presses the suspension button 1003 on the color adjustment screen 1000 that presents the progress status of the color matching processing illustrated in part (b) of FIG. 18, the information processing apparatus 20 starts processing to suspend (stopping processing) the color matching processing being executed, and the color adjustment screen 1000 illustrated in part (b) of FIG. 18 is transitioned to the color adjustment screen 1000 illustrated in part (c) of FIG. 18 by the display control unit 212. Specifically, in a case where the reading processing of the plurality of adjustment color charts CC or the confirmation color chart is being executed by the image reading device 30, the image reading device 30 completes the reading processing of the color chart being executed at the time when the suspension button 1003 is pressed, and stops without executing the reading processing of the next color chart. Further, the processing executable based on the color information data of the color chart of which the reading processing has already been completed (preliminary determination to be performed by the first determination unit 207, profile generation to be performed by the profile generation unit 208, profile registration to be performed in the image forming apparatus 10, or posterior determination to be performed by the second determination unit 210) is continued to be executed until the color matching processing normally or abnormally ends. The color adjustment screen 1000 illustrated in part (d) of FIG. 18 is an example of a screen that presents a result of the processing executable based on the color information data of the color chart of which the reading processing has already been completed continued to be executed until the color matching processing normally or abnormally ends. In other words, the read button 1004 is again operable on the color adjustment screen 1000 illustrated in part (d) of FIG. 18. Here, in a case where the user desires the image reading device 30 to restart the reading processing of the adjustment color chart CCA, CCB or the confirmation color chart, the user presses the read button 1004. Then, the display control unit 212 again displays the read dialog box 1400 illustrated in part (a) of FIG. 18.

Screen Transition when Color Matching Processing is Ended

FIG. 19 is a diagram illustrating an example of a screen transition when the color matching processing is ended in the information processing apparatus according to the present embodiment. A description is given of the screen transition when the color matching processing is ended in the information processing apparatus 20 with reference to FIG. 19.

The color adjustment screen 1000 illustrated in FIG. 19 presents a state in which the color matching processing displayed in the color matching progress area 1100 is completed for the individual image forming apparatus 10 and for each sheet type, and the processing of posterior determination displayed in the posterior determination area 1300 is completed for the individual image forming apparatus 10 and for each sheet type. In this state, it is assumed that the user presses the exit button 1005. In a case where an indication indicating that the color matching processing for the individual image forming apparatus 10 and a sheet type abnormally ends (including an end with a warning) exists or in a case where an indication indicating that the determination result of posterior determination for the individual image forming apparatus 10 and a sheet type is abnormal exists, the display control unit 212 displays an alert dialog box 1500 illustrated in part (b) of FIG. 19.

The alert dialog box 1500 illustrated in part (b) of FIG. 19 is a dialog box for notifying that the indication indicating that the color matching processing for the individual image forming apparatus 10 and a sheet type abnormally ends (including an end with a warning) exists or the indication indicating that the determination result of posterior determination for the individual image forming apparatus 10 and a sheet type is abnormal exists. In the example illustrated in part (b) of FIG. 19, a message indicating that the profile is not stored is displayed in the alert dialog box 1500 since the indication indicating that the color matching processing for the individual image forming apparatus 10 and a sheet type abnormally ends exists. The alert dialog box 1500 includes an "OK" button 1501 and a cancel button 1502. The "OK" button 1501 is a button for forcibly stopping the alert dialog box 1500 and returning to the top screen 2000. The cancel button 1502 is a button for returning to the color adjustment screen 1000 in order to execute the color matching processing or the processing of posterior determination again.

In a case where the user presses the "OK" button 1501, the display control unit 212 displays the top screen 2000 illustrated in part (c) of FIG. 19. In a case where the user presses the cancel button 1502, the display control unit 212 displays the color adjustment screen 1000 illustrated in part (a) of FIG. 19.

As described above, in the information processing apparatus 20 according to the present embodiment, the communication unit 201 causes the image reading device 30 to execute the reading processing of the adjustment color chart CC printed out by the image forming apparatus 10, and the display control unit 212 causes the display 608 to display, for the individual image forming apparatuses 10, the progress status of each stage of the processing from the reading processing of the adjustment color chart CC to be executed by the image reading device 30 for the individual image forming apparatus 10 to the processing of registration of the profile generated based on the color information data obtained by the image reading device 30 executing the reading processing of the adjustment color chart CC. In addition, the display control unit 212 causes the display 608 to display the states of the reading processing of the adjustment color chart CC, preliminary determination executed based on the color information data, profile generation, and profile registration in stages as a progress status of each stage of the processing. Specifically, color information data includes identification information for identifying the individual image forming apparatus 10, the colorimetric value acquisition unit 203 acquires the color information data obtained by the image reading device 30 executing the reading processing of the adjustment color chart CC, the identification unit 204 identifies, from identification information included in the color information data acquired by the colorimetric value acquisition unit 203, the image forming apparatus 10 that has printed out the adjustment color chart CC corresponding to the color information data, and the first determination unit 207 performs preliminary determination regarding unevenness of the adjustment color chart CC based on the color information data. When the first determination unit 207 determines that the determination results of the preliminary determination are not abnormal, the profile generation unit 208 generates a profile based on the color information data, and the profile transmission unit 209 transmits the profile generated by the profile generation unit 208 to the image forming apparatus 10 identified by the identification unit 204 and receives a notification indicating that the profile is successfully registered in the image forming apparatus 10. When the identification unit 204 identifies the image forming apparatus 10, the display control unit 212 displays information indicating the image forming apparatus 10 (device name, etc.) as the progress status in order to indicate that the reading processing of the adjustment color chart CC corresponding to the image forming apparatus 10 has been executed, the results of the preliminary determination performed by the first determination unit 207 as a progress status, the result of profile generation performed by the profile generation unit 208 as a progress status, and the result of profile registration transmitted by the profile transmission unit 209 as a progress status. As a result, it is not necessary to perform various works such as colorimetry (reading) of a color chart printed out by the individual image forming apparatus 10, checks of values of the reading result, profile generation and registration, and the like for the individual image forming apparatuses 10. Thus, the workability of color matching processing and the manageability of data of color matching result are increased.

Note that, in a case where at least a portion of the functional units of the image forming apparatus 10 and the information processing apparatus 20 according to the above-described embodiment is implemented by execution of a computer program, the program can be prestored in a ROM or the like. The programs to be executed by the image forming apparatus 10 and the information processing apparatus 20 according to the embodiment described above may be configured to be recorded in any computer-readable recording medium, such as a compact disc read only memory (CD-ROM), a flexible disk (FD), a compact disc recordable (CD-R), or a DVD, in an installable or executable file format and provided as computer program products. In addition, the programs to be executed by the image forming apparatus 10 and the information processing apparatus 20 according to the embodiment described above may be configured to be stored in a computer connected to a network such as the Internet and provided by being downloaded via the network. Further, the programs to be executed by the image forming apparatus 10 and the information processing apparatus 20 according to the embodiment described above may be configured to be provided or distributed via a network such as the Internet. The programs to be executed by the image forming apparatus 10 and the information processing apparatus 20 according to the embodiment described above have module structure including at least one of the above-described functional units. Regarding the actual hardware related to the programs, the CPU 501 (CPU 601) reads and executes the programs from the memory (e.g., the system memory 502, the auxiliary memory 508, or the auxiliary memory 605) to load the programs onto the main memory to implement the above-described functional units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising circuitry configured to:
    cause an image reading device to execute reading processing of a first color chart printed by a particular image forming apparatus of a plurality of image forming apparatuses; and
    display, for each of the plurality of image forming apparatuses,
        a device name of a respective image forming apparatus of the plurality of image forming apparatuses, in response to the respective image forming apparatus completing reading a first sheet, and
        a progress status of each stage of processing from the reading processing of the first color chart to registration processing of a profile generated based on color information data obtained by the reading processing of the first color chart, the stages of processing including
            the reading processing of the first color chart,
            a first determination processing based on the color information data,
            generation processing of the profile, and
            the registration processing of the profile.

2. The information processing apparatus according to claim 1, wherein:
    the color information data includes first identification information for identifying the particular image forming apparatus; and
    the circuitry is further configured to:
        acquire the color information data obtained by the reading processing of the first color chart;
        identify, from the first identification information included in the color information data, the particular image forming apparatus that has printed the first color chart corresponding to the color information data;
        perform the first determination processing regarding unevenness of the first color chart based on the color information data;
        generate a profile based on the color information data in response to a result of the first determination processing not being abnormal;
        transmit the profile to the particular image forming apparatus identified from the first identification information and to receive a notification indicating that the profile is successfully registered in the particular image forming apparatus;
        display, in response to the particular image forming apparatus being identified from the first identification information, information indicating the particular image forming apparatus as the progress status in order to indicate that the reading processing of the first color chart corresponding to the particular image forming apparatus has been executed;
    display a result of the first determination processing as the progress status;
    display a result of generation processing of the profile as the progress status; and
    display a result of registration processing of the profile as the progress status.

3. The information processing apparatus according to claim 2, wherein:
    the circuitry is configured to:
    cause the image reading device to collectively execute the reading processing of the first color chart printed by each of the plurality of image forming apparatuses; and
    display the progress status of the processing for each of the plurality of image forming apparatuses, in an order of completion of the reading processing of the first color chart by the image reading device.

4. The information processing apparatus according to claim 2, wherein:
    the first color chart includes a plurality of sheets, and
    the circuitry is configured to:
        display information indicating the particular image forming apparatus having printed the first color chart as the progress status in response to the particular image forming apparatus being identified from the color information data corresponding to one sheet of the first color chart read by the image reading device; and sequentially display the progress status of each stage of the processing from the first determination processing in response to a remaining sheet of the first color chart other than the one sheet of the color chart being read by the image reading device.

5. The information processing apparatus according to claim 4, wherein:

in response to the image reading device collectively executing the reading processing of the first color chart printed by each of the plurality of image forming apparatuses in a state where the first color chart printed by a first image forming apparatus of the plurality of image forming apparatuses is mixed with the first color chart printed by a second image forming apparatus of the plurality of image forming apparatuses, the circuitry is configured to:

display information indicating the first image forming apparatus as the progress status in response to the reading processing of a first sheet of the first color chart printed by the first image forming apparatus; and display the progress status of each stage of the processing according to the reading processing of the first color chart printed by the second image forming apparatus and the remaining sheet of the first color chart printed by the first image forming apparatus.

6. The information processing apparatus according to claim 2, wherein:

in response to the result of the first determination not being normal but satisfying a certain condition, the circuitry is configured to:

display the result of the first determination as the progress status; and proceed generating the profile based on the color information data corresponding to the result of the first determination.

7. The information processing apparatus according to claim 1, wherein:

in response to any stage of the processing not being successfully completed, the circuitry is configured to display a display area that presents the progress status of the stage not successfully completed in a color different from a color used when the processing is successfully completed; and display nothing in a display area that presents the progress status of a stage of the processing subsequent to the stage not successfully completed.

8. The information processing apparatus according to claim 2, wherein:

the color information data further includes second identification information for identifying a sheet type of the first color chart; and the circuitry is configured to:

identify a sheet type of the first color chart corresponding to the color information data from the second identification information included in the color information data; and display the progress status of each stage of the processing for each of the plurality of image forming apparatuses identified from the first identification information and for each sheet type identified from the second identification information.

9. The information processing apparatus according to claim 2, wherein:

the circuitry is configured to:

cause the image reading device to execute reading processing of a second color chart printed by the particular image forming apparatus with the profile generated based on the color information data being applied; and acquire information obtained by the reading processing of the second color chart;

perform a second determination processing by comparing the second color chart printed by the particular image forming apparatus with a print standard based on the information acquired by the reading processing of the second color chart; and display a result of the second determination.

10. The information processing apparatus according to claim 9, wherein:

the circuitry is configured cause the image reading device to collectively execute reading processing of the first color chart printed by the particular image forming apparatus and the second color chart printed by another of the plurality of image forming apparatuses.

11. An image forming system comprising:

the image reading device;

the plurality of image forming apparatuses; and the information processing apparatus according to claim 1.

12. The information processing apparatus according to claim 1, wherein the circuitry is configured to display the stages of processing in an order corresponding to the order of the processing.

13. An information processing method comprising:

causing an image reading device to execute reading processing of a first color chart printed by a particular image forming apparatus of a plurality of image forming apparatuses; and displaying on a display, for each of the plurality of image forming apparatuses, a device name of a respective image forming apparatus of the plurality of image forming apparatuses, in response to the respective image forming apparatus completing reading a first sheet, and a progress status of each stage of processing from the reading processing of the first color chart to registration processing of a profile generated based on color information data obtained by the reading processing of the first color chart, the stages of processing including the reading processing of the first color chart, a first determination processing based on the color information data, generation processing of the profile, and the registration processing of the profile.

14. The method of claim 13, wherein the displaying the progress status includes displaying the stages of processing in an order corresponding to the order of the processing.

15. A non-transitory recording medium carrying computer readable codes for controlling a computer system to perform the method of claim 13.

* * * * *